(12) United States Patent
Lepchenske et al.

(10) Patent No.: US 10,674,006 B2
(45) Date of Patent: *Jun. 2, 2020

(54) MEDIA CONTROL DEVICES, SYSTEMS AND METHODS

(71) Applicants: Kirk Lepchenske, Pocatello, ID (US); Jonathan S. Jensen, Pocatello, ID (US)

(72) Inventors: Kirk Lepchenske, Pocatello, ID (US); Jonathan S. Jensen, Pocatello, ID (US)

(73) Assignee: Kirk Lepchenske, Pocatello, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/027,346

(22) Filed: Jul. 4, 2018

(65) Prior Publication Data
US 2019/0020753 A1    Jan. 17, 2019
US 2020/0014786 A9    Jan. 9, 2020

Related U.S. Application Data

(63) Continuation of application No. 15/209,095, filed on Jul. 13, 2016, now Pat. No. 10,063,689, and a
(Continued)

(51) Int. Cl.
*H04M 1/60*    (2006.01)
*H04M 1/725*    (2006.01)
(Continued)

(52) U.S. Cl.
CPC .......... *H04M 1/7258* (2013.01); *H04B 1/385* (2013.01); *H04M 1/05* (2013.01);
(Continued)

(58) Field of Classification Search
CPC .. H04M 1/7253; H04M 1/6041; H04M 1/605; H04M 1/6058; H04M 1/05
See application file for complete search history.

(56) References Cited

U.S. PATENT DOCUMENTS

D222,967 S    2/1972    Hawkins et al.
D271,301 S    11/1983    Manning et al.
(Continued)

FOREIGN PATENT DOCUMENTS

JP        1528689 S        7/2015
WO    WO 2007/065732 A1    6/2007
(Continued)

OTHER PUBLICATIONS

Georgia Tech Research Institute & Georgia Institute of Technology, "Workstation Design—Buttons and Switches", May 2, 2015.*
(Continued)

*Primary Examiner* — Christopher M Brandt
(74) *Attorney, Agent, or Firm* — Flaig Law Office, PLLC; Jason E. Flaig

(57) ABSTRACT

Media control devices, methods and systems for communicating with mobile devices and headsets are disclosed. At least one control device may include a top surface, a bottom surface, circuitry for communicating with mobile devices and headsets, at least one button designed to be manipulated by users wearing gloves; a microphone for receiving audio input from the users, and a securement mechanism for securing the control device to the users' person, clothing and/or equipment.

20 Claims, 11 Drawing Sheets

Related U.S. Application Data continuation-in-part of application No. 29/533,282, filed on Jul. 15, 2015, now Pat. No. Des. 772,201.

(60) Provisional application No. 62/192,550, filed on Jul. 14, 2015.

(51) Int. Cl.
| | | |
|---|---|---|
| *H04M 1/05* | (2006.01) | |
| *H04B 1/3827* | (2015.01) | |
| *A45F 5/02* | (2006.01) | |

(52) U.S. Cl.
CPC .......... *H04M 1/60* (2013.01); *H04M 1/7253* (2013.01); *H04M 1/72558* (2013.01); *A45F 5/02* (2013.01); *H04M 1/6058* (2013.01); *H04M 1/72533* (2013.01); *H04M 2250/02* (2013.01)

(56) References Cited

U.S. PATENT DOCUMENTS

| | | | |
|---|---|---|---|
| D271,762 S | 12/1983 | Manning | |
| D318,670 S | 7/1991 | Taniguchi | |
| D334,043 S | 3/1993 | Taniguchi et al. | |
| 5,486,986 A | 1/1996 | Brada | |
| 5,499,713 A | 3/1996 | Huffer | |
| D375,748 S | 11/1996 | Hartman | |
| D377,459 S | 1/1997 | Dziersk | |
| D401,523 S | 11/1998 | Baker | |
| 5,949,407 A | 9/1999 | Sato | |
| D463,787 S | 10/2002 | Beraut et al. | |
| D469,423 S | 1/2003 | Tong et al. | |
| D491,922 S | 6/2004 | Poulet | |
| D511,157 S | 11/2005 | Johnson | |
| 6,991,364 B2 | 1/2006 | Yang | |
| D567,229 S | 4/2008 | Griffin | |
| D569,813 S | 5/2008 | Charleux et al. | |
| D569,831 S | 5/2008 | Chung et al. | |
| D585,876 S | 2/2009 | Griffin | |
| D595,262 S | 6/2009 | Nousiainen | |
| D614,166 S | 4/2010 | Brickstad | |
| D614,167 S | 4/2010 | Brickstad | |
| D640,239 S | 6/2011 | McManigal | |
| D640,240 S | 6/2011 | McManigal | |
| 7,962,040 B2 | 6/2011 | Yoshikawa | |
| 7,983,722 B2 | 7/2011 | Lowles et al. | |
| 8,232,963 B2 | 7/2012 | Orsley et al. | |
| D671,505 S | 11/2012 | Clark et al. | |
| 8,389,857 B2 | 3/2013 | Petrillo | |
| D685,750 S | 7/2013 | Nakagawa | |
| 8,548,538 B2 | 10/2013 | Lowles et al. | |
| D709,837 S | 7/2014 | Charleux | |
| 8,812,064 B2 | 8/2014 | Lowles et al. | |
| D712,873 S | 9/2014 | Krauss | |
| D716,268 S | 10/2014 | Yamamoto | |
| D717,275 S | 11/2014 | Burgett | |
| D719,935 S | 12/2014 | Diamond | |
| D728,528 S | 5/2015 | Akana et al. | |
| 9,025,806 B2 | 5/2015 | Krissman et al. | |
| D731,456 S | 6/2015 | Dahlberg | |
| D735,147 S | 7/2015 | Willcocks et al. | |
| D747,293 S | 1/2016 | Mistry | |
| D761,742 S | 7/2016 | Landerholm et al. | |
| 2002/0068600 A1* | 6/2002 | Chihara | H04B 1/385 455/557 |
| 2002/0077565 A1 | 6/2002 | Burdorff et al. | |
| 2006/0079269 A1* | 4/2006 | Sorotzkin | H04M 1/0214 455/550.1 |
| 2006/0192362 A1* | 8/2006 | Makhsous | A61G 5/1043 280/250.1 |
| 2007/0132740 A1 | 6/2007 | Meiby | |
| 2008/0084390 A1 | 4/2008 | Jones | |
| 2008/0167092 A1* | 7/2008 | Ueda | H04M 1/6066 455/575.2 |
| 2008/0242378 A1* | 10/2008 | Lowles | H04M 1/6058 455/575.2 |
| 2009/0051649 A1* | 2/2009 | Rondel | G06F 1/163 345/156 |
| 2009/0057124 A1 | 3/2009 | Orsley et al. | |
| 2009/0081966 A1* | 3/2009 | Neu | H04B 1/202 455/100 |
| 2009/0175456 A1* | 7/2009 | Johnson | H04R 5/04 381/1 |
| 2009/0179768 A1* | 7/2009 | Sander | H04M 1/05 340/13.27 |
| 2009/0289807 A1* | 11/2009 | Enwright | G08B 25/016 340/691.4 |
| 2011/0230115 A1 | 9/2011 | Wang et al. | |
| 2011/0263303 A1 | 10/2011 | Lowles et al. | |
| 2011/0266122 A1 | 11/2011 | Zaharchuk et al. | |
| 2011/0306393 A1* | 12/2011 | Goldman | H04M 1/6066 455/575.2 |
| 2012/0077549 A1* | 3/2012 | Gibbons | H04R 1/08 455/569.1 |
| 2012/0299830 A1* | 11/2012 | Worthington | G05G 9/047 345/163 |
| 2013/0094660 A1* | 4/2013 | Weinstein | H04R 1/10 381/74 |
| 2013/0129110 A1 | 5/2013 | Harper | |
| 2014/0031094 A1 | 1/2014 | Lowles et al. | |
| 2014/0193020 A1 | 7/2014 | Krissman et al. | |
| 2014/0254848 A1* | 9/2014 | Petterson | H04R 1/1041 381/334 |
| 2015/0379866 A1* | 12/2015 | Paek | G08C 17/02 340/12.5 |

FOREIGN PATENT DOCUMENTS

| | | |
|---|---|---|
| WO | WO 2011/021937 A1 | 2/2011 |
| WO | WO 2013/075098 A1 | 5/2013 |
| WO | WO 2014/110056 A1 | 7/2014 |
| WO | WO2017088046 A1 | 6/2017 |

OTHER PUBLICATIONS

Unofficialnetworks, This Glove-On FitBit Style Device Might Have Cracked the Code for Mountain Wearables . . . , Feb. 10, 2016, (see exhibit cover sheet for details).

Yodel Up, Why Yodelup?, at least as early as Jul. 21, 2016, http://www.yodelup.com/ (accessed Jul. 21, 2016), (see exhibit cover sheet for details).

Internet Archive Waybackmachine, yodelup.com Coming Soon!, at least as early as Aug. 21, 2013, http://web.archive.org/ . . . (see ex. cover sheet for details).

Internet Archive Waybackmachine, Future Home of YodelUp.com, at least as early as Dec. 18, 2014, http://web.archive.org/web/20141218145217/ . . . (see exhibit cover sheet).

Internet Archive Waybackmachine, Wear it and pair it !, at least as early as Feb. 4, 2016, http://web.archive.org/web/20160204181840/ . . . (see exhibit cover sheet).

Internet Archive Waybackmachine, KickStarter, at least as early as Mar. 5, 2016, http://web.archive.org/web/20160305183527/ . . . (see exhibit cover sheet).

Yodelup Twitter, earliest tweet shown as Jan. 10, 2016, https://twitter.com/yodel_up (accessed Jul. 21, 2016), (see exhibit cover sheet for details).

PR Newswire, YodelUP—World's first on-glove wearable for communication and music launches on Kickstarter, Feb. 24, 2016, http://www.prnewswire.com/ne . . . (see ex. cover sheet).

Crunchbase, YodelUP YodelUP, (date unknown), https://www.crunchbase.com/user/506301 (accessed Jul. 21, 2016), (see exhibit cover sheet for details).

Crunchbase, YodelUP, (date unknown), https://www.crunchbase.com/organization/yodelup#/entity (accessed Jul. 21, 2016), (see exhibit cover sheet for details).

U.S. Appl. No. 62/260,249, filed Jun. 1, 2017, Daryoush Sahebjavaher, et al.

(56) References Cited

OTHER PUBLICATIONS

Queen's Printer, Corporate Registry Notices . . . http://www.bclaws.ca/civix/document/id/corpreg/corpreg/crpn0825fin1116 (accessed Oct. 10, 2018), see attachment for details.
Yodel Technologies Inc., Yodel Technologies Inc. (YodelUP) | Vancouver, BC, Canada Startup, https://gust.com/companies/yodelup . . . see attachment for details.
The University of British Columbia Department of Mechanical Engineering, . . . http://mech.ubc.ca/ramin-and-daryoush/ (accessed Nov. 3, 2018), see attachment for details.
Daryoush Sahebjavaher, Daryoush (Darius) Sahebjavaher, MASc. | LinkedIn, https://www.linkedin.com/in/dariussj/ (accessed Nov. 3, 2018), see attachment for details.
Yodeltech Inc., . . . https://www.kickstarter.com/projects/1416120732/yodelup-on-glove-wearable-for-music-and-communicat?ref=discovery&term=yodelup . . . see attachment for details.
Yodel UP, YodelUP—Home | Facebook, https://www.facebook.com/yodelup (accessed Nov. 3, 2018), see attachment for details.
Yodel UP, YodelUP (@yodel_up) • Instagram photos and videos, https://www.instagram.com/yodel_up/ (accessed Nov. 3, 2018), see attachment for details.
Ramin S. Sahebjavaher, Google Drive, https://drive.google.com/drive/folders/0B_N5V-HsSDy6TE1oRV84dUdVLW8 (accessed Nov. 3, 2018), see attachment for details.
Ramin Sahebjavaher, Ramin Sahebjavaher, PhD | LinkedIn, https://www.linkedin.com/in/raminsj/ (accessed Nov. 3, 2018), see attachment for details.
Yodel Technologies Inc., . . . https://www.linkedin.com/company/yodel-technologies-inc./ (accessed Nov. 3, 2018), see attachment for details.
Stuart Kelly, Tt eSports Shock One USB Gaming Headset Review, Apr. 11, 2011, Hardware Heaven, http://www.hardwareheaven.com/2011/04/tt-esports-shock . . . , see attachment for details.
Windows Central Shop, HTC Wired Remote Control Stereo Headset, at least of Nov. 30, 2009, http://shop.windowscentral.com/htc-wired-remote-control . . . , see attachment for details.
Jays AB Music & Audio, Jays Headset Control, at least of Jan. 15, 2015, https://play.google.com/store/apps/details?id= . . . , see attachment for details.
Aliexpress, Nokia N8 N9 Universal Headset Earphone w/ Mic Volume Control Cord Clip, at least of Jan. 15, 2015, http://www.aliexpress.com/store . . . , see attachment for details.
Microsoft, Xbox One Stereo Headset Adapter, at least of Jan. 15, 2015, http://www.xbox.com/en-US/xbox-one/accessories/headsets/ . . . , see attachment for details.
Amazon, Plantronics Audio 478 Stereo USB Headset, at least of Jan. 15, 2015, http://www.amazon.com/Plantronics-Audio-478-Stereo-Headset/ . . . , see attachment for details.
Stuart Davidson, Logitech Ultimate Ears 6000 Headset Review, at least of Jan. 15, 2015, http://www.hardwareheaven.com/2012/09/logitech-ultimate- . . . , see attachment for details.
amazon.com, Panasonic ErgoFit Best in Class In-Ear Earbuds Headphones with Mic/Controller . . . , at least of Oct. 3, 2016, https://www . . . . , see attachments for details.
Facebook, YodelUP, date of earliest post Jan. 10, 2016, https://www.facebook.com/yodelup/ (accessed Jul. 21, 2016), (see exhibit cover sheet for details).
Georgia Institute of Technology, HSI Expeditionary . . . , https://hsimed.gtri.gatech.edu/guidelines/wd_buttons.php, at least of Nov. 17, 2017, other details unknown or as shown.
Yodel UP, YodelUP (@Yodel_UP) | Twitter, https://twitter.com/yodel_up (accessed Nov. 3, 2018), see attachment for details.
Yodel UP, YodelUP Smart Band for Snow Sports, http://www.yodelup.com/ (accessed Nov. 3, 2018), see attachment for details.
Yodel UP, YodelUP Smart Band for Snow Sports, http://www.yodelup.com/aboutus/ (accessed Nov. 3, 2018), see attachment for details.
Yodel Up, YodelUP Smart Band for Snow Sports, http://www.yodelup.com/faq/ (accessed Nov. 3, 2018), see attachment for details.
Market Footprint Ltd, . . . http://www.datalog.co.uk/browse/detail.php/CompanyNumber/CABC1086265/CompanyName/YODEL+Technologies+Inc . . . see attachment for details.
Christopher M. Brandt, Office Action, regarding U.S. Appl. No. 15/209,095, dated Aug. 3, 2017.
Christopher M. Brandt, Office Action, regarding U.S. Appl. No. 15/209,095, dated Nov. 24, 2017.
Christopher M. Brandt, Applicant-Initiated Interview Summary, regarding U.S. Appl. No. 15/209,095, dated Jan. 4, 2018.
Christopher M. Brandt, Examiner-Initiated Interview Summary, regarding U.S. Appl. No. 15/209,095, dated Jan. 23, 2018.
Christopher M. Brandt, Notice of Allowability, regarding U.S. Appl. No. 15/209,095, dated Apr. 25, 2018.

\* cited by examiner

MEDIA CONTROL DEVICES, SYSTEMS AND METHODS

CROSS-REFERENCE TO RELATED APPLICATIONS

The present patent document claims the benefit of and priority to:

U.S. Non-Provisional patent application Ser. No. 15/209,095, entitled "MEDIA CONTROL DEVICES, SYSTEMS AND METHODS", filed on Jul. 13, 2016, the entire contents of which is hereby incorporated by reference as part of this application, which said application timely claimed the benefit of and priority to U.S. Provisional Patent Application Ser. No. 62/192,550, filed on Jul. 14, 2015, as well as the benefit of and priority to U.S. Design Patent Application Ser. No. 29/553,282, entitled "CONTROL DEVICE", filed on Jul. 15, 2015;

U.S. Design Patent Application Ser. No. 29/533,282, entitled "CONTROL DEVICE", filed on Jul. 15, 2015, the entire contents of which is hereby incorporated by reference as part of this application;

U.S. Design Patent Ser. No. D772,201 S, entitled "CONTROL DEVICE", which issued from U.S. Design Patent Application Ser. No. 29/533,282, on Nov. 22, 2016, the entire contents of which is hereby incorporated by reference as part of this application; and U.S. Provisional Patent Application Ser. No. 62/192,550, entitled "CONTROL DEVICES, SYSTEMS AND METHODS", filed on Jul. 14, 2015, the entire contents of which is hereby incorporated by reference as part of this application.

BACKGROUND

Technical field

The disclosure relates to control devices, systems and methods for communicating with mobile devices and headsets.

Discussion of related field

Sports enthusiasts engage in a variety of activities that make it difficult to wear and operate mobile devices while they are engaged in activities and/or while wearing related clothing and/or equipment. For example, individuals who are skiing may want to listen to music from their MP3 or smartphone and/or answer a phone call while skiing. Skiers often wear gloves which make it difficult to handle and control mobile devices and/or remote controls. Furthermore, it is inconvenient for skiers to have to stop skiing, pull off at least one glove, and handle and operate a mobile device and/or remote control and select the song they wish to listen to and/or answer the phone. The same is true for motorcyclists, dirt bike riders, snowboarders, snowmobilers, cross-country skiers, cyclists (e.g. road bikers, mountain bikers, commuters, etc.), hikers, snowshoe'ers, joggers, and any other activity in which individuals may desire to listen to music and/or answer their phone while participating and/or engaging in the activity (including for example, while driving a car).

In light of the foregoing discussion, there may be a need for control devices, systems and methods which may allow individuals to operate mobile devices and/or take phone calls while engaged in activities and/or while wearing related clothing and/or equipment.

SUMMARY

In one aspect a control device for communicating with a mobile device and a headset, the control device may include: a top surface; a bottom surface; circuitry for communicating with a mobile device and a headset; wherein audio signals may be communicated from the mobile device to the control device which may communicate the audio signals to the headset; wherein the circuitry may be adapted to enable a user to control audio signals and answer phone calls communicated to the control device from the mobile device; at least one button which may be designed to be manipulated by a user wearing gloves; wherein the circuitry may facilitate communication with the control device and the mobile device when the at least one button is manipulated by the user; a microphone for receiving audio input from the user; and a securement mechanism for securing the control device to the user's person, clothing and/or equipment.

Implementations may include one or more of the following features. The at least one button may facilitate at least one of the following functions: play audio signals, pause audio signals, stop audio signals, mute audio signals, fast forward audio signals, rewind audio signals, skip audio signals, shuffle audio signals, select audio signals, control the speed of audio signals, control the volume of audio signals, answer incoming calls, initiate calls, and/or terminate calls. The at least one button may include a first button, a second button, and a third button. Said control device may further include a volume control mechanism for facilitating the control of the volume of audio signals communicated to the headset. The volume control mechanism is a volume control wheel or a volume control slide. The at least one button may be about ⅛ of an inch to about 5 inches wide, about ⅛ of an inch to about 7 inches long, and about 1/32 of an inch to about 2 inches thick. The at least one button may only be manipulated when about 0.10 of a Newton to about 10 Newtons of force is exerted on the at least one button. The circuitry may automatically pause, stop and/or mute signals communicated from the mobile device to the control device upon the arrival of an incoming call to the mobile device. The circuitry may automatically resume playing signals communicated from the mobile device to the control device upon the termination of an incoming call to the mobile device. The circuitry may include a first signal path, a second signal path, and a third signal path; the first signal path may facilitate the flow of signals from the mobile device ultimately to either a right or left speaker of the headset; the second signal path may facilitate the flow of signals from the mobile device ultimately to either a right or left speaker of the headset; and the third signal path may facilitate the flow of signals from the control device ultimately to the mobile device. The circuitry may include a volume control system that, in conjunction with the volume control mechanism, may facilitate the control of the volume of audio signals communicated to the headset. The circuitry may include a first push button, a second push button, a third push button, a microphone system, a volume control system, and a volume control mechanism. The first push button may facilitate the operation of the first button; the second push button may facilitate the operation of the second button; the third push button may facilitate the operation of the third button; the microphone system may facilitate the operation of the microphone; and the volume control system and the volume control mechanism may facilitate the control of the volume of audio signals communicated to the headset. The circuitry may include a switch which when actuated inactivates the microphone. The circuitry may include at least one microprocessor system and at least one wireless communication system. The control device may include an interface and a volume control mechanism. The interface may be adapted to allow the user to receive information from and input information into the control device; the circuitry may include a microprocessor system, a display system, a wireless communication system, a power system, a microphone system, and a volume control system; the microprocessor system may facilitate the processing of communication from at least one of the following: the control device, the mobile device and/or the headset; the display system may facilitate the operation of the interface; the wireless communication system may facilitate wireless communication with the control device and at least one of the following: the mobile device and/or the headset; the power system may facilitate the management of power of at least one of the following: the control device, the mobile device and/or the headset; the microphone system may facilitate the operation of the microphone; and wherein the volume control system, in conjunction with the volume control mechanism, may facilitate the control of the volume of audio signals communicated to the headset. The microprocessor system may include: a data packetization/de-packing and/or merging/splitting system; an audio/video remote control protocol and/or encode/decode system; a display interface system; a user control inputs system; an advanced audio distribution profile and/or decode/encode system; a digital output conditioning and/or volume control system; a digital-to-analog conversion system; a digital input conditioning system; an analog-to-digital conversion system; and a local and/or boom microphone selector system. The control device may be manufactured from waterproof material.

In one aspect a method for using a control device for communicating with a mobile device and a headset, may include: listening to audio signals communicated from the mobile device to a control device (which may include: a top surface; a bottom surface; circuitry for communicating with a mobile device and a headset; wherein audio signals may be communicated from the mobile device to the control device which may communicate the audio signals to the headset; wherein the circuitry may be adapted to enable a user to control audio signals and answer phone calls communicated to the control device from the mobile device; at least one button which may be designed to be manipulated by a user wearing gloves; wherein the circuitry may facilitate communication with the control device and the mobile device when the at least one button is manipulated by the user; a microphone for receiving audio input from the user; and a securement mechanism for securing the control device to the user's person, clothing and/or equipment) which communicates the audio signals to the headset while a user engages in a sport and/or other activity; an incoming call may arrive at the mobile device; audio signals being communicated to the user prior to the arrival of the incoming call may be automatically stopped, paused or muted; manipulating the at least one button on the control device while wearing gloves or other equipment to take the incoming call; speaking into the microphone on the control device to communicate with the caller; and terminating the call when the caller hangs up or when the user manipulates the at least one button on the control device.

In another aspect a method for using a control device for communicating with a mobile device and a headset, may include: listening to audio signals communicated from the mobile device to a control device (which may include: a top surface; a bottom surface; circuitry for communicating with a mobile device and a headset; wherein audio signals may be communicated from the mobile device to the control device which may communicate the audio signals to the headset; wherein the circuitry may be adapted to enable a user to control audio signals and answer phone calls communicated to the control device from the mobile device; at least one button which may be designed to be manipulated by a user wearing gloves; wherein the circuitry may facilitate communication with the control device and the mobile device when the at least one button is manipulated by the user; a microphone for receiving audio input from the user; and a securement mechanism for securing the control device to the user's person, clothing and/or equipment) which communicates the audio signals to the headset while a user engaging in a sport and/or other activity; and manipulating the at least one button on the control device while wearing gloves or other equipment to modify the audio signals being communicated from the mobile device to the control device which communicates the audio signals to the headset.

In another aspect a control device for communicating with a mobile device and a headset, the control device may include: a top surface; a bottom surface; circuitry for communicating with a mobile device and a headset, wherein the circuitry is adapted to enable a user to control the volume of audio signals, to stop and play audio signals, and to answer incoming phone calls; at least three buttons situated on the top surface designed to be actuated by a user wearing gloves; a microphone for receiving audio input from the user; a securement mechanism for securing the control device to at least one of the following: the user's person, clothing or equipment; and wherein the control device may be operable in wet conditions.

Implementations may include one or more of the following features. Three of the at least three buttons may be situated substantially in line relative to each other. The at least three buttons may include a first button, a second button, and a third button; wherein at least one of the at least three buttons may allow the user to control the volume of audio signals; wherein at least one of the at least three buttons may allow the user to stop audio signals; wherein at least one of the at least three buttons may allow the user to play audio signals; and wherein at least one of the at least three buttons may allow the user to answer incoming phone calls. The control device may further include a jack for receiving a plug. The headset may include a microphone alternate to the microphone of the control device; and wherein the circuitry may include a switch, which when articulated, may inactivate the microphone on the control device and allow a user to use the headset's microphone. The control device may be detachable from both the mobile device and the headset. At least one of the at least three buttons may only be actuated when about 1.7 Newton to about 10 Newtons of force is exerted on at least one of the at least three buttons. The circuitry may automatically pause, stop or mute signals communicated from the mobile device to the control device upon the arrival of an incoming phone call to the mobile device; wherein the circuitry may automatically resume playing signals communicated from the mobile device to the control device upon the termination of an incoming phone call to the mobile device. The at least three buttons may include a first button, a second button, and a third button; wherein the first button may allow the user to control the volume of audio signals; wherein the second button may allow the user to control the volume of audio signals; wherein the third button may allow the user to stop and play audio signals and answer incoming phone calls. The circuitry may include a first signal path, a second signal path, and a third signal path; wherein the first signal path may facilitate the flow of signals from the mobile device ultimately to either a right or left speaker of the headset; wherein the second signal path may facilitate the flow of signals from the mobile device ultimately to a speaker alternate to that of the first signal path; and wherein the third signal path may facilitate the flow of signals from the control device ultimately to the mobile device. The circuitry may include a volume control system that, in conjunction with at least one of the at least three buttons, may facilitate the control of the volume of audio signals. The circuitry may include a first push button, a second push button, a third push button, and a microphone system. The first push button may facilitate the operation of the first button; wherein the second push button may facilitate the operation of the second button; wherein the third push button may facilitate the operation of the third button; and wherein the microphone system may facilitate the operation of the microphone. The at least three buttons may consist of exactly three buttons: a first button, a second button and a third button. The circuitry may include at least one microprocessor system and at least one wireless communication system. The control device may further include an interface and a volume control mechanism; wherein the interface is adapted to allow the user to receive information from and input information into the control device; wherein the circuitry may include a microprocessor system, a display system, a wireless communication system, a power system, a microphone system, and a volume control system; wherein the microprocessor system may facilitate the processing of communication from at least one of the following: the control device, the mobile device and the headset; wherein the display system may facilitate the operation of the interface; wherein the wireless communication system may facilitate wireless communication with the control device and at least one of the following: the mobile device and the headset; wherein the power system may facilitate the management of power of at least one of the following: the control device, the mobile device and the headset; wherein the microphone system may facilitate the operation of the microphone; and wherein the volume control system, in conjunction with the volume control mechanism, may facilitate the control of the volume of audio signals communicated to the headset.

The microprocessor system may include: a data packetization/de-packing and/or merging/splitting system; an audio/video remote control protocol and/or encode/decode system; a display interface system; a user control inputs system; an advanced audio distribution profile and/or decode/encode system; a digital output conditioning and/or volume control system; a digital-to-analog conversion system; a digital input conditioning system; an analog-to-digital conversion system; and a local and/or boom microphone selector system. The control device may be manufactured to be waterproof.

In another aspect a method for using a control device for communicating with a mobile device and a headset, may include: a control device which may include a top surface; a bottom surface; circuitry for communicating with a mobile device and a headset, wherein the circuitry is adapted to enable a user to control the volume of audio signals, to stop and play audio signals, and to answer incoming phone calls;—at least three buttons situated on the top surface designed to be actuated by a user wearing gloves;—a microphone for receiving audio input from the user; a securement mechanism for securing the control device to at least one of the following: the user's person, clothing or equipment; and wherein the control device is operable in wet conditions; and wherein the method of using the control device may include: listening to music communicated to the headset while the user engages in a sport or other activity; automatically stopping the music being communicated to the headset when an incoming phone call arrives at the mobile device; actuating at least one of the at least three buttons on the control device while wearing gloves or other equipment to take the incoming phone call; speaking into the microphone on the control device to communicate with the caller; and terminating the call when the caller hangs up or when the user actuates at least one of the at least three buttons on the control device.

In another aspect a method for using a control device for communicating with a mobile device and a headset, may include: a control device which may include: a top surface; a bottom surface; circuitry for communicating with a mobile device and a headset, wherein the circuitry is adapted to enable a user to control the volume of audio signals, to stop and play audio signals, and to answer incoming phone calls; at least three buttons situated on the top surface designed to be actuated by a user wearing gloves; a microphone for receiving audio input from the user; a securement mechanism for securing the control device to at least one of the following: the user's person, clothing or equipment; and wherein the control device is operable in wet conditions; wherein the method of using the control device may include: listening to audio signals communicated to the headset while a user engaging in a sport or other activity; and actuating at least one of the at least three buttons on the control device while wearing gloves or other equipment to modify the audio signals being communicated to the headset.

These general and specific aspects may be implemented by using systems, apparatuses, devices, methods and structures or any combination thereof. Certain implementations may provide one or more of the following advantages. Embodiments may not achieve any or all of the listed advantages. Further, this is not an exhaustive list of all possible advantages of the disclosure.

The disclosure may be configured to be and/or provide users with the following: the ability to operate while wearing gloves and/or other clothing and/or equipment; the ability to be secured and/or attached to an operator's sleeve; the ability to reduce the likelihood of the disclosure from fall off during use; the ability to see the disclosure while it is clipped onto your clothing and/or equipment; the ability to feel when a button (and/or the like) on the disclosure has been clicked; and the ability to be water resistant.

Other features and advantages may be apparent from the following detailed description, the accompanying drawings, and the claims.

BRIEF DESCRIPTION OF THE DRAWINGS

Various embodiments of the disclosure will now be discussed with reference to the appended drawings. It is appreciated that these drawings depict only typical embodiments of the disclosure and are not to be considered limiting of its scope.

DETAILED DESCRIPTION

The following description illustrates principles of the disclosure which may be applied in various ways to provide different embodiments. There may be many different forms of embodiments of the disclosure, and as such, embodiments should not be limited to those set forth herein and shown in the accompanying drawings. While exemplary embodiments of the disclosure may be shown and described herein, changes and modifications may be made without departing from its scope and concepts. That which is set forth herein and shown in the accompanying drawings is offered to illustrate the principles of the disclosure and not as limitations. Other variations of the disclosure may be included within the principles of the disclosure.

In one or more embodiments, regardless if expressly stated herein and/or illustrated in the accompanying drawings, the disclosure may be configurable, adaptable and customizable to meet the various needs of various users in various circumstances and/or to be compatible and/or used in conjunction with various systems, apparatuses, articles, devices, means, methods and/or structures.

In one or more embodiments, the disclosure may be configured in various ways, by various means and/or various methods, with various components and/or various parts, to various dimensions (such as but limited to shapes, lengths, widths, heights, depths, and/or sizes) and/or with and/or from various materials, and/or any combinations thereof. The specific parts, materials, members, devices, systems and/or components of the disclosure may be configured together and/or separate and/or with other materials, members, devices, systems and/or components and/or any combinations thereof.

The drawings herein may but do not necessarily illustrate the disclosure to scale. The drawings herein may but do not necessarily depict the exact positions, shapes, sizes, layouts, designs, angles and/or other dimensions and/or configurations in which the disclosure may be implemented. In one or more embodiments, the components of the disclosures may be configured to various positions, shapes, sizes, layouts, designs, angles and/or other dimensions and/or configurations from various materials, for various reasons.

In one or more embodiments, the disclosure may be used for various uses and/or purposes.

Figure 1:
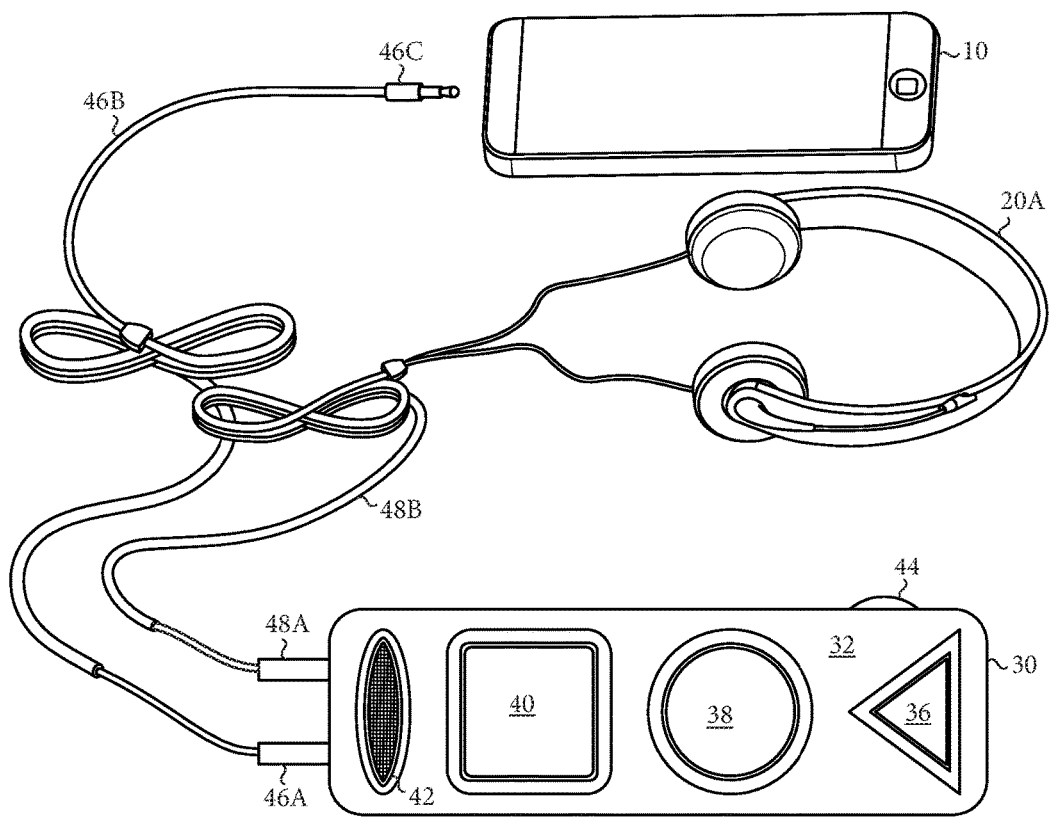
FIG. 1 is a view of embodiments of various aspects of a control device, a mobile device and a headset.

FIG. 1 shows embodiments of a mobile device 10, a headset 20A and a control device 30. In one or more embodiments, control device 30 may be used to control and/or coordinate the flow of information, data and communication to and/or from mobile device 10 and ultimately to and/or from headset 20A. For example, in one or more embodiments, a user may use control device 30 to select and play music from the mobile device 10 and/or answer incoming calls from the mobile device 10.

As shown in in FIG. 1, control device 30 may include a top surface 32, a bottom surface 34 (not shown), and at least one button (such as, a first button 36, a second button 38, and a third button 40). In one or more embodiments, the functionality of at least one button may vary. For example, in one or more embodiment, first button 36 may be configured as the play button so that when a user manipulates first button 36 it may facilitate the playing of music and/or other media; second button 38 may be configured as the stop and/or pause button so that when a user manipulates second button 38 it may facilitate the stopping and/or pausing of music and/or other media; and third button 40 may be configured as the fast forward and/or rewind button so that when a user manipulates third button 40 it may facilitate the fast forwarding and/or rewinding of music and/or other media. In one or more embodiments, the functionality of each button may be adapted, modified and or changed to accommodate various circumstances and user needs. For example, at least one button may facilitate more than one functionality. In one or more embodiments, at least one button may facilitate and/or be manipulated to play music, pause music, stop music, mute music, fast forward music, rewind music, skip a song, shuffle music, select music, control the speed of audio communication, control the volume of audio communication, answer incoming calls, initiate calls, terminate calls, and/or other functionality.

In one or more embodiments, the dimensions of at least one button and/or other components of control device 30 may enable the user to manipulate or otherwise operate at least one button while wearing gloves and/or other clothing and/or equipment. For example, in one or more embodiments, at least one button on control device 30 may be about ⅛ of an inch to about 5 inches wide, about ⅛ of an inch to about 7 inches long, and about 1/32 of an inch to about 2 inches thick.

In one or more embodiments, control device 30 may be designed to enable a user to manipulate control device 30 while wearing one or more of the following: skis gloves, snow mobile gloves, motorcycle gloves, mountain bike and other bicycle gloves and/or other bulky gloves.

In one or more embodiments, control device 30 may be designed to enable a user to manipulate control device 30 while wearing one or more of the following brand name ski gloves: The North Face, Hester, Rossignol, Black Diamond, Mountain Hardware, Dakine, Arctertx, Outdoor Research, Burton, Marmot, Mammut, Columbia, Gordini, etc.

In one or more embodiments, control device 30 may be designed to enable a user to manipulate control device 30 while wearing one or more of the following brand name snowmobile gloves: Klim, HJC, Fly, Field Sheer, FXR, Gordini, etc.

In one or more embodiments, control device 30 may be designed to enable a user to manipulate control device 30 while wearing one or more of the following brand name motorcycle gloves: Firstgear, Xelement, Icon, Harley Davidson, Alpinestar, Joe rocket, Klim, REV IT, River Road, AGV, Cortech, Dainese, etc.

In one or more embodiments, control device 30 may be designed to enable a user to manipulate control device 30 while wearing one or more of the following brand name mountain bike gloves: Specialized, Giro, Fox, Endura, ShengEn, Troy Lee Designs, Bontrager, Sugoi, etc.

In one or more embodiments, control device 30 may be designed to enable a user to manipulate control device 30 while wearing one or more of the following brand name work gloves: Mechanix Wear, Uline, Tillman, Craftsman, Full Force, Galeton, Workwear, etc.

In one or more embodiments, control device 30 may be designed to enable a user to manipulate control device 30 while wearing one or more of the skis gloves disclosed in the following patents: U.S. Pat. No. 5,443,287 A (entitled "Quick release ski pole and strap system"), U.S. Pat. No. 4,698,851 A (entitled "Ski glove"), U.S. Pat. No. 4,733,412 A (entitled, "Insulated ski glove"), U.S. Pat. No. 4,757,555 A (entitled, "Ski racing glove"), and U.S. Pat. No. 5,628,069 A (entitled, "Glove with bistable spring element"). All of the subject matter relating to the ski gloves in the aforementioned patents is incorporated herein by reference. Alternatively and/or in addition, in one or more embodiments, control device 30 may be designed to enable a user to manipulate control device 30 while wearing one or more of the gloves or equipment disclosed in the following patents and patent applications: U.S. D722208 A (entitled, "Glove"), U.S. 20090000010 A1 (entitled, "High tactility glove system"), U.S. 20140215685 A1 (entitled, "Glove with palm hammock"), U.S. 20130318684 A1 (entitled, Glove"), U.S. 20140075639 A1 (entitled, "Protective glove"), U.S. Pat. No. 3,918,096 A (entitled, "Flexible motorcycle glove"), U.S. 20110289643 A1 (entitled, "Glove structure, in particular for the motorcycling sector, and method for the manufacture thereof"), U.S. Pat. No. 4,094,014 A (entitled, "Workman's glove"), U.S. Pat. No. 4,224,692 A (entitled, "Freight handling glove"), U.S. Pat. No. 6,715,152 B2 (entitled, "Motorcycling glove"), and U.S. 20050034213 A1 (entitled, "Sports glove").

In one or more embodiments, at least one button may be configured so that at least one button cannot be manipulated unless a user exerts a certain level of force on the button. For example, in one or more embodiments, at least one button on control device 30 may only be fully manipulated when at least about 0.10 of a Newton to about 10 Newtons of force is exerted on at least one button. Such configuration may prevent at least one button from inadvertently being actuated. Such configuration may enable the user to receive tactile feedback and allow the user to know when at least one button has been actuated. In one or more embodiments, at least one button may be configured to click or produce a feel when at least one button is actuated for the purpose of preventing inadvertent manipulation, providing tactile feedback and/or allowing the user to know when at least one button has been actuated.

Although the control device 30 shown in FIG. 1 includes three buttons (that is, first button 36, second button 38 and third button 40) of particular shapes and sizes, in one or more embodiments, the numbers, shapes and sizes of the buttons may vary. For example, in one or more embodiments, first button 36 may be configured into the shape of a square, second button 38 may be configured into the shape of an oval, and third button 40 may be configured into the shape of a triangle.

In one or more embodiments, control device 30 may include a microphone (such as, microphone 42) for receiving audio input from a user and/or transmitting audio to a user. In one or more embodiments, if an incoming call arrives at the mobile device 10 while a user is listening to music, the mobile device 10 and/or the control device 30 may automatically mute, pause or stop the music and notify the user of the incoming call. If the user desires to answer the incoming call, in one or more embodiments, the user may press at least one button (such as first button 36, second button 38 and/or third button 40) on the control device 30 and speak into the microphone (such as microphone 42) on the control device 30 and communicate with the person on the other end of the call, all while optionally continuing to engage in a sporting or other activity and/or optionally while wearing gloves and/or other clothing or equipment. For example, a person may be skiing down the slopes listening to music when an incoming call is received. The control device 30 and/or mobile device 10 may automatically pause or mute the music and allow the user to answer the call. If the user decides to take the call the user may manipulate at least one button (or provide a verbal command or engage some other means) on control device 30. The user may speak into the microphone 42 and have a conversation with the person on the other end of the call while continuing to ski. When the conversation is over, in one or more embodiments, the control device 30 and/or mobile device 10 may terminate the call when the person on the other end hangs up and/or upon the user's manipulation of at least one button (and/or via a voice command or manipulation of some other means), whereupon the control device 30 and/or mobile device 10 may automatically play and/or resume the music, all while the user optionally continues to ski.

In one or more embodiments, the disclosure may be designed to incorporate the technology and/or aspects and/or modifications of the technology disclosed in U.S. Pat. No. 7,650,145 B2 (entitled "Telephone set, communication adaptor, home appliance control method, and program recording medium") for enabling the control device 30 to facilitate the aspects of the above described functionality. All of the subject matter in the aforementioned patent is incorporated herein by reference.

Although not shown in FIG. 1, in one or more embodiments, control device 30 may be configured with alternative and/or additional microphones. Although not shown in FIG. 1, in one or more embodiments, control device 30 may be configured without a microphone.

In one or more embodiments, control device 30 may include a volume control mechanism for controlling the volume of audio communication (such as, a volume control wheel 44). Although FIG. 1 and elsewhere, shows volume control mechanism as a wheel, in one or more embodiments, the volume control mechanism may be in various forms, such as a knob, a dial, a slide, a button, a switch, a pad, a wheel, etc. In one or more embodiments, the size of the volume control mechanism (such as, volume control wheel 44) may enable the user to manipulate or otherwise operate the volume control mechanism while wearing gloves and/or other clothing and/or equipment. Although not shown in FIG. 1, in one or more embodiments, control device 30 may be configured without a volume control mechanism.

In one or more embodiment, control device 30 may communicate with mobile device 10, headset 20A and/or other devices by various means (including wirelessly, non-wirelessly and/or a combination of both wirelessly and non-wirelessly), whether developed later or known at the time of filing. For example, in one or more embodiment, as shown in FIG. 1, control device 30 may communicate with mobile device 10 via a plug 46A, a cord 46B, and a plug 46C and/or to headset 20A via plug 48A and a cord 48B.

In one or more embodiment, control device 30 may be between about ¼ of an inch to about 6 inches wide (such as approximately 1 inch wide), between about ¼ of an inch to about 9 inches long (such as approximately 4 inches long), and between about ¹⁄₁₆ of an inch to about 3 inches thick (such as approximately ¼ of an inch thick) which thickness may not include the thickness of a securement mechanism (such as clip 50). In one or more embodiments, the width, length and/or thickness of control device 30 may be adapted, modified and/or changed to accommodate various circumstances and user needs. In one or more embodiments, control device 30 may be made from one or materials, such as, for example, metals, non-metals, metalloids, woods and natural products, ceramics, polymers and plastics, alloys and/or the like and/or other materials. In one or more embodiments, the materials may possess various qualities making it operable in various conditions, such as, for example, being water proof and/or water resistant (which may allow control device 30 to function in wet conditions), shatter proof or durable (which may allow control device 30 to function in conditions where it may be subject to impact), heat resistant (which may allow control device 30 to function in hot conditions), etc. In one or more embodiments, control device 30 may be configured in such a way that it may vibrate (such as, for example, when calls are received and/or when control device 30 is operated). In one or more embodiments, control device 30 may be configured in such a way that it may generate sound (such as, for example, when calls are received and/or when control device 30 is operated).

Although mobile device 10 is shown in FIG. 1 as an iPhone, in one or more embodiments, mobile device 10 could be various types of mobile devices, including, for example, various tablets, laptops, smartphones and other cellphones, MP3 players, portable DVD and/or CD players, Personal Digital Assistants (PDA's), cassette tape players, and/or other types of devices which may transmit audio communications, whether developed later or known at the time of filing. In one or more embodiments, mobile device 10 may be capable of storing, streaming, playing, and/or displaying media of any kind, including, for example, images, audio, and/or video, whether digital, non-digital and/or otherwise.

Although headset 20A is shown in FIG. 1 as headphones, in one or more embodiments, various types of devices which allow users to listen to audio (whether capable of wireless communication or otherwise), including, for example, earbuds (binaural, monaural or otherwise), ear pads and/or various other devices (which may include various features, such as a headband, a microphone, an earpiece, etc.) may be used instead of and/or in addition to headphones.

Although plugs (that is, plugs 46A, 46C and 48A) are shown in FIG. 1 as headset and mobile device connectors, in one or more embodiments, other connectors may be used to connect various devices to control device 30, such as, for example, RJ plugs (such as, RJ9, RJ10, RJ22, RJ11, and RJ45 plugs), USB (including, USB-mini) connectors, 3.5 mm plugs, 2.5 mm plugs, 6.35 mm plugs, 6.4 mm plugs, ¼ inch plugs, RCA plugs, Two Prong connectors, Nokia N3 adapters, Polaris connectors, QD (quick disconnect) connectors, and/or the like and/or other connectors. In one or more embodiments, control device 30 may be modified to include jacks which receive various connectors.

Figure 2:
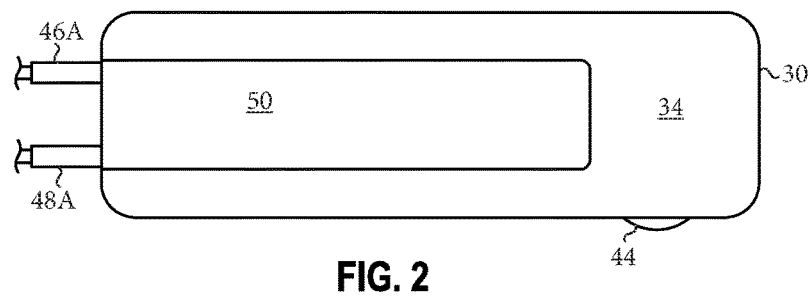
FIG. 2 is a bottom view of one embodiment of various aspects of a control device.

FIG. 2 shows a bottom view of the embodiment of control device 30 illustrated in FIG. 1 including bottom surface 34 and a securement mechanism (such as a clip 50) for securing the control device to a user's person, clothing and/or equipment, as well as volume control wheel 44, plug 46A and plug 48A. Although FIG. 2 and elsewhere show the securement mechanism as clip 50, other variations may be implemented, such as Velcro, straps, chains, belts, buckles, snaps, buttons, loops, zippers, pins, holes, knots, fasteners, ropes, clamps, clips, and any other materials and/or adhesives desirable.

Figure 3:
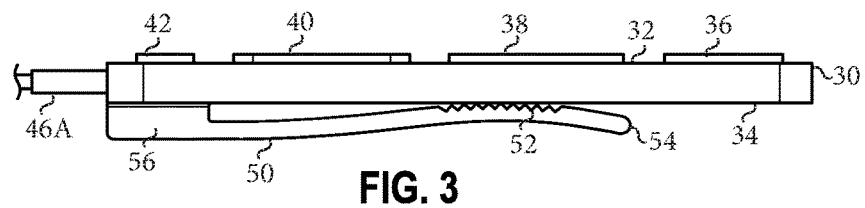
FIG. 3 is a left side view of one embodiment of various aspects of a control device.
Figure 4:
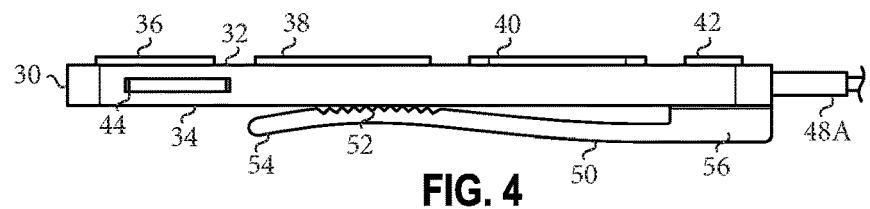
FIG. 4 is a right side view of one embodiments of various aspects of a control device.

FIGS. 3 and 4 show alternative side views of the embodiment of control device 30 illustrated in FIG. 1 including top surface 32, bottom surface 34, first button 36, second button 38, third button 40, microphone 42, and clip 50. In one or more embodiments, clip 50 may be designed to help secure control device 30 to the user's clothing and/or equipment and/or to reduce the likelihood that control device may fall off said clothing and/or equipment once it is secured. In one or more embodiments, clip 50 may include teeth-like configurations 52, a tip 54 and a base 56. In one or more embodiments, clip 50 may be designed to resiliently bend so that a user may pull tip 54 away from control device 30 (thereby creating an opening through which the user's clothing and/or equipment may be placed) and then release tip 54 to allow clip 50 to press down on the user's clothing and/or equipment towards bottom surface 34 (thereby securing control device 30 to the user's clothing and/or equipment). In one or more embodiments, the user may not have to pull up on tip 54 but may simply slide his or her clothing and/or equipment in between clip 50 and bottom surface 34. In either case, in one or more embodiments, the amount of force in which clip 50 presses the user's clothing and/or equipment toward control device 30, may be sufficient to prevent control device 30 from falling off while the user engages in a sport or other activity. In one or more embodiments, the disclosure may be configured in such a way so as to allow a user to see the disclosure while it is clipped onto their clothing and/or equipment (see FIG. 9). FIG. 3 also shows one embodiment of control device 30 including plug 46A. FIG. 4 also shows one embodiment of control device 30 including plug 48A and volume control wheel 44. As stated above and although not shown in FIG. 3 or 4, control device 30 may be configured with an alternative means for securing it to a user's clothing and/or equipment and/or for preventing it from falling off while the user engages in a sport or other activity. For example, in one or more embodiments, control device 30 may be configured with a strap which may wrap around the user's appendage, clothing and/or equipment.

Figure 5:
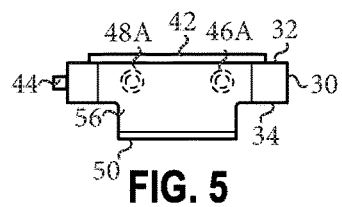
FIG. 5 is rear view of one embodiment of various aspects of a control device.

FIG. 5 shows a back view of the embodiment of control device 30 illustrated in FIG. 1 including top surface 32, bottom surface 34, microphone 42, volume control wheel 44, plug 46A, plug 48A, clip 50, and base 56.

Figure 6:
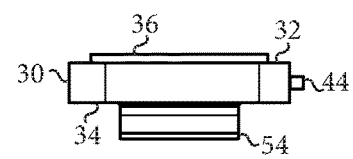
FIG. 6 is a front view of one embodiment of various aspects of a control device.

FIG. 6 shows a front view of the embodiment of control device 30 illustrated in FIG. 1 including top surface 32, bottom surface 34, first button 36, volume control wheel 44 and tip 54.

Figure 7:
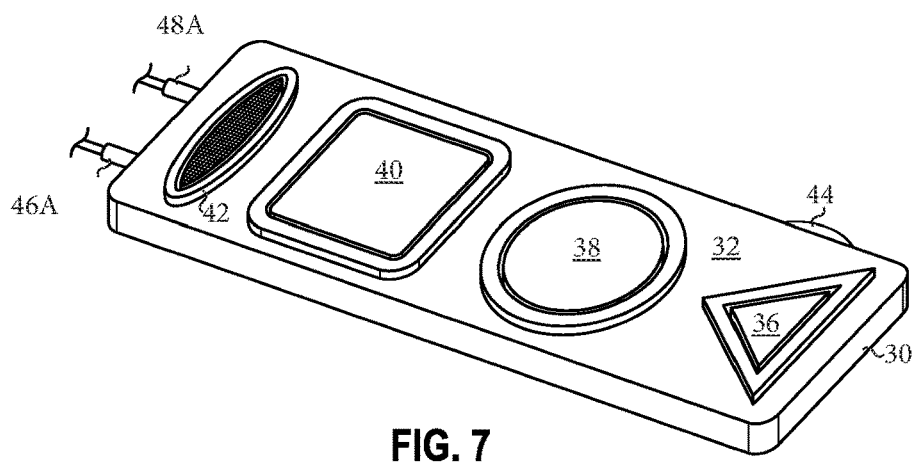
FIG. 7 is a top perspective view of one embodiment of various aspects of a control device.

FIG. 7 shows a top perspective view of the embodiment of control device 30 illustrated in FIG. 1 including top surface 32, first button 36, second button 38, third button 40, microphone 42, volume control wheel 44, plug 46A, and plug 48A.

Figure 8:
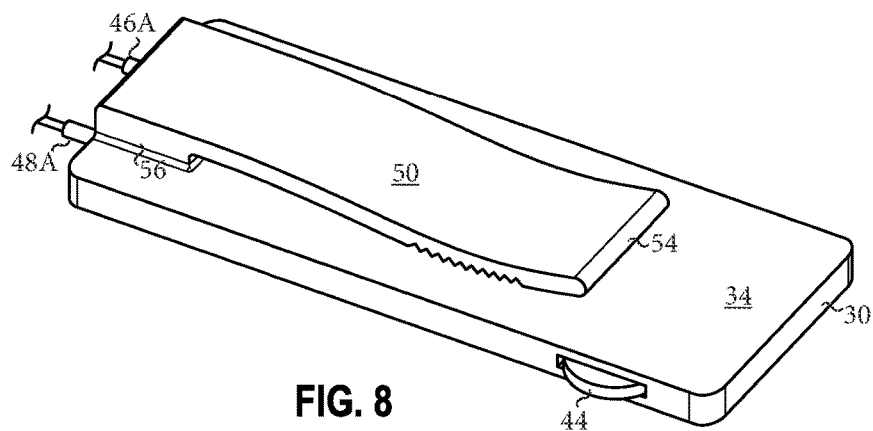
FIG. 8 is a bottom perspective view of one embodiment of various aspects of a control device.

FIG. 8 shows a bottom perspective view of the embodiment of control device 30 illustrated in FIG. 1 including bottom surface 34, volume control wheel 44, plug 46A, plug 48A, clip 50, tip 54, and base 56.

Figure 9:
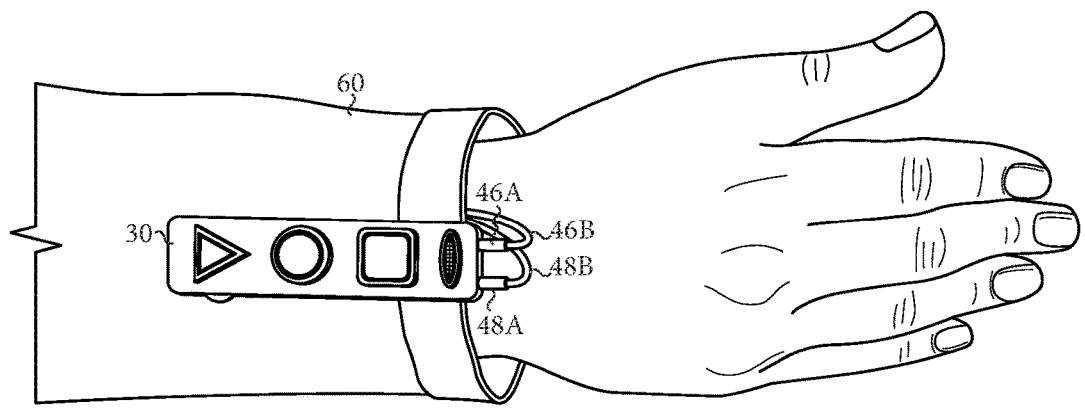
FIG. 9 is a top view of one embodiment of various aspects of a control device situated on a user's sleeve.

FIG. 9 shows one embodiment of control device 30 secured to a user's sleeve 60. Although not necessarily illustrated in FIG. 9, in one or more embodiments, control device 30 may be configured to be secured to bulky coat sleeves and to be operated by a user wearing bulky clothing and/or equipment (such as, for example, ski gloves). In one or more embodiments, plug 46A may be configured to and/or with cord 46B and plug 48A may be configured to and/or with cord 48B. In one or more embodiments, plug 46A and plug 48A may attached at one end of control device 30 as illustrated in FIGS. 1 through 9. However, in one or more embodiments, control device 30 may be configured so that plug 46A and plug 48A are on the other side of control device 30 or on opposite sides of control device 30 or control device may not be configured to receive plugs (such as plug 46A and plug 48A). In one or more embodiment, plug 46A and plug 48A may run up user's sleeve (underneath or on top of said sleeve), wherein one plug may be configured to headset 20A and the other plug may be configured to mobile device 10. In one or more embodiments, such configuration may help prevent control device 30 from falling off while being worn by the user because the length of cord 46B and/or cord 48B may limit the distance control device 30 may move. Although not shown in FIG. 9, control device 30 may be configured to communicate wirelessly with mobile device 10 and/or control device 30 and/or other devices.

Figure 10:
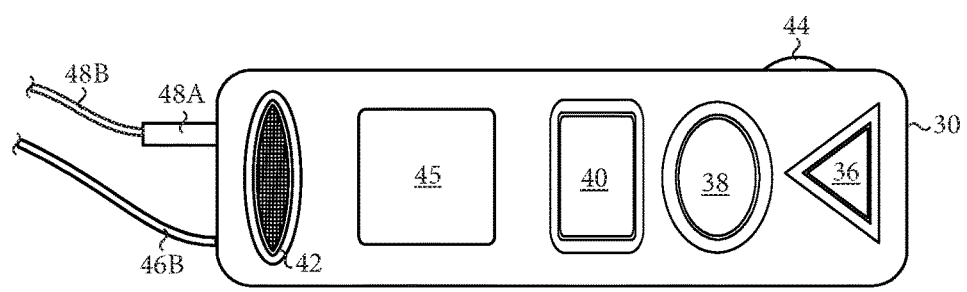
FIG. 10 is a top view of one embodiment of a control device.

FIG. 10 shows one embodiment of control device 30 which may include top surface 32, bottom surface 34 (although not shown in FIG. 10), first button 36, second button 38, third button 40, microphone 42, volume control wheel 44, and an interface 45. In one or more embodiments, interface 45 and/or its associated hardware and/or software may have the capacity to display various things to users (such as, for example, text, lights, shapes, symbols, videos, etc.) and/or to receive user input from users and/or other sources via various means, such as, for example, via graphical user interfaces ("GUI") which may include, for example, digital buttons (for example, play, pause, stop, reverse, fast forward, etc.), text fields, etc. In one or more embodiments, interface 45 and/or its associated hardware and/or software may include and/or have the capacity to utilize none, one or more than one of the following technologies (and/or technologies other than as listed as follows): liquid crystal display ("LCD"), Organic Light Emitting Diode display ("OLED"), Active-Matrix Organic Light-Emitting Diode display ("AMOLED"), Retina Display, Gorilla Glass, E-ink, and/or touch screens and/or like or other means for displaying information, data, and/or communication. In one or more embodiments, various information, data and/or communication may be displayed on the interface 45, such as, for example, .asf, .wma, .wmv, .wm, .asx, .wax, .wvx, .wmx, .wpl, .dvr-ms, .wmd, .avi, .mpg, .mpeg, .m1v, .mp2, .mp3, .mpa, .mpe, .m3u, .mid, .midi, .rmi, .aif, .aifc, .aiff, .au, .snd, .wav, .cda, .ivf, .wmz, .wms, .mov, .m4v, .mp4v, .3g2, .3gp2, .3gp, .3gpp, .m4a, .aac, .adt, .adt, and/or .m2ts files and/or other files, and/or information, data and/or communication related to such files.

In one or more embodiments, other components of control device 30 may work in conjunction with the interface 45, such as, for example, microphone 42 and its associated hardware and/or software may play the audio associated with the information, data and/or communication the interface 45 communicates to the user. In one or more embodiments, interface 45 and/or its associated hardware and/or software may include and/or have the capacity to utilize abilities, systems, devices, means, functionality, and/or features not expressly and/or impliedly described herein and/or illustrated in the drawings to this application but which may be obvious to one skilled in the art, whether developed later or known at the time of filing.

Figure 11:
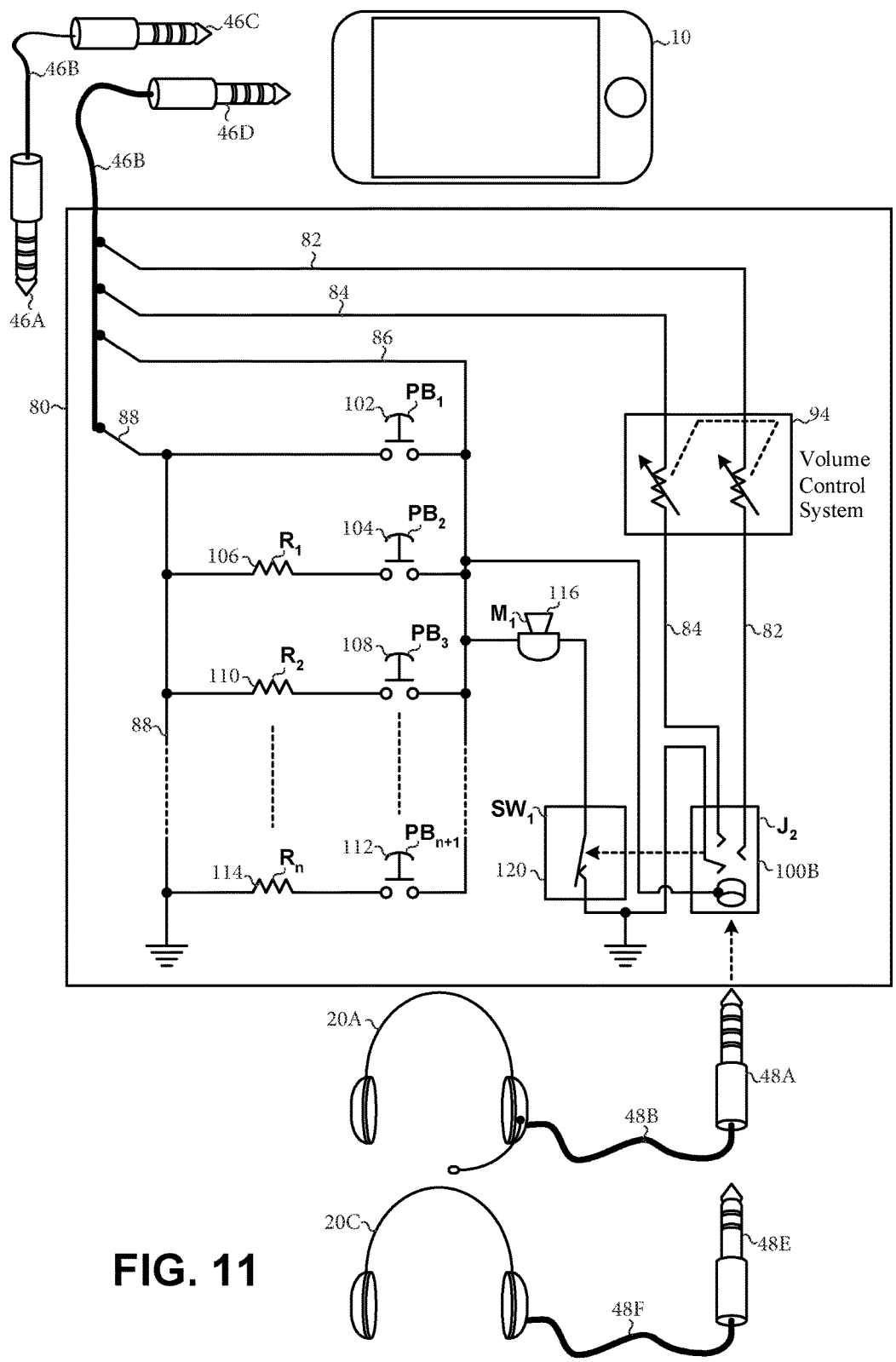
FIG. 11 is a schematic diagram of one embodiment of circuitry and other components for a control device, as well as embodiments of various devices.
Figure 12:
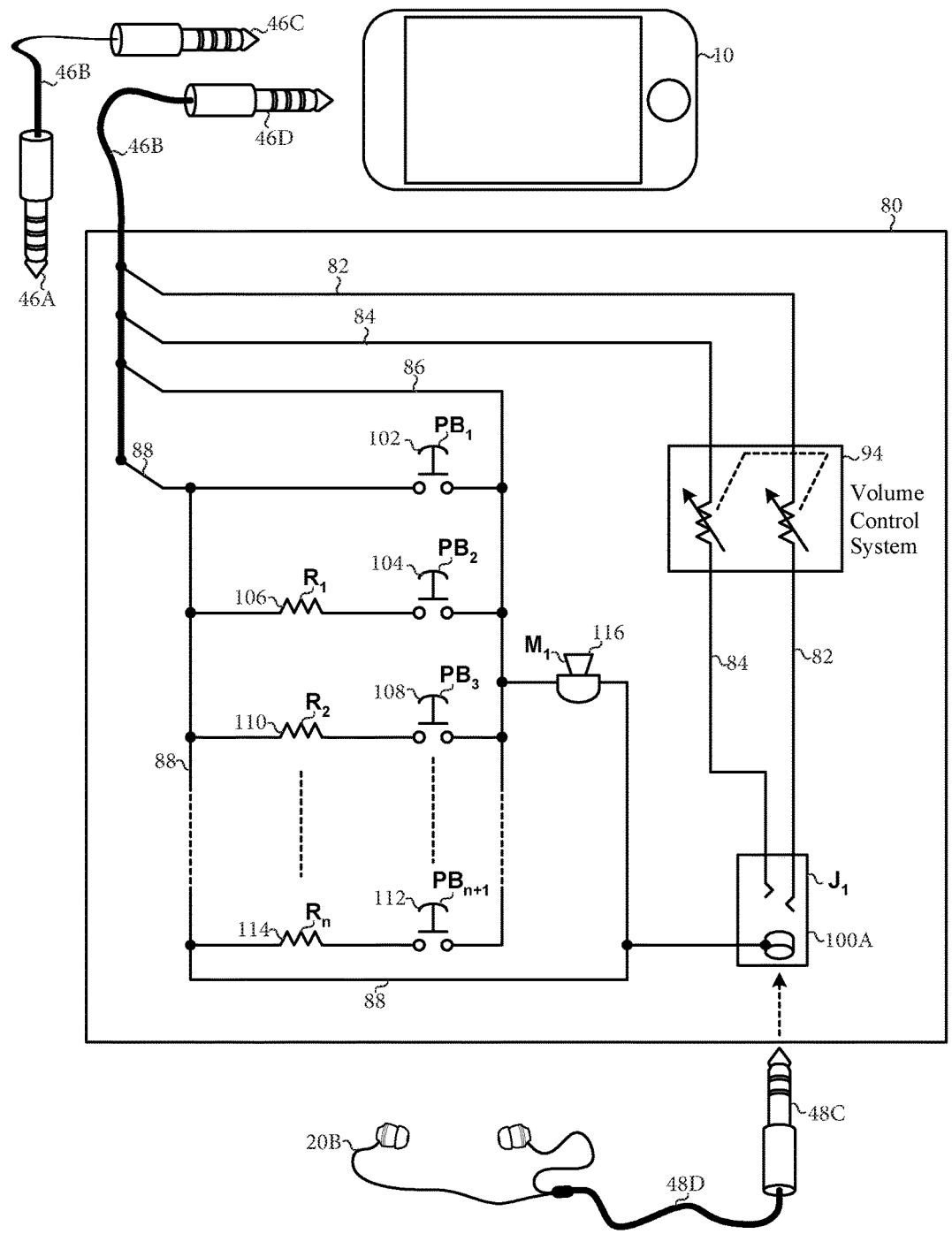
FIG. 12 is a schematic diagram of another embodiment of circuitry and other components for a control device, as well as embodiments of various devices.
Figure 13:
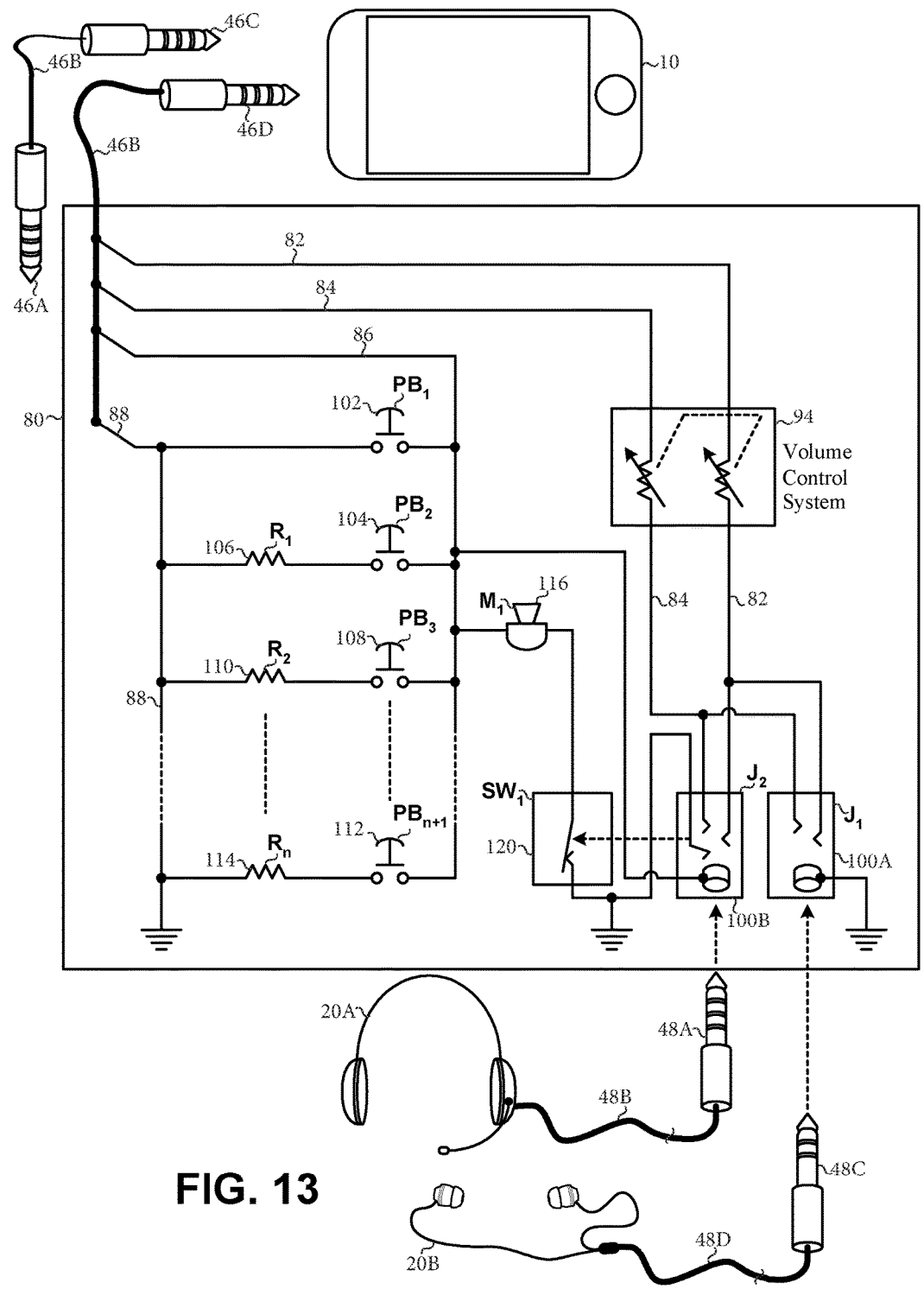
FIG. 13 is a schematic diagram of another embodiment of circuitry and other components for a control device, as well as embodiments of various devices.

In one or more embodiments, control device 30 may include circuitry (such as circuitry 80) for facilitating communication with control device 30 and mobile device 10 and control device 30 and various headsets and/or other devices. FIGS. 11, 12 and 13 illustrate schematic diagrams of various embodiments of circuitry 80 and other components of control device 30, as well as embodiments of various devices. Although FIGS. 11, 12 and 13 may show circuitry 80 in particular configurations, in one or more embodiments, alternative and/or additional configurations of circuitry 80 may be implemented.

In one or more embodiments, circuitry 80 may include a signal path 82, a signal path 84, a signal path 86, and/or a signal path 88. In one or more embodiments, signal path 82 may be configured to at least facilitate audio signals to ultimately flow from mobile device 10 and/or other devices to either a right or left speaker of various devices; signal path 84 may be configured to at least facilitate audio signals to ultimately flow from mobile device 10 and/or other devices to either a right or left speaker of various devices; signal path 86 may be configured to at least facilitate signals to flow from a microphone 42 to mobile device 10 and/or other devices and/or component of control device 30; and signal path 88 may be configured to at least facilitate grounding of various circuitry 80 components and/or other devices. In one or more embodiments, signal path 82, signal path 84, signal path 86, and/or signal path 88 may converge, be near each other, and/or be bundled together via cord 46B which may be configured to a plug 46D which may be inserted into mobile device 10. Alternatively and/or in addition, in one or more embodiments, circuitry 80 may be configured with a jack and/or port so that it may receive plug 46A which may be configured to cord 46B which may be configured to plug 46C which may be inserted into mobile device 10.

In one or more embodiments, circuitry 80 may include a means for controlling the volume of audio signals. In one or more embodiments, said means for controlling the volume of audio signals may include a volume control system 94 and its associated hardware and/or software which may be associated with and/or facilitate the operation of volume control wheel 44.

In one or more embodiments, circuitry 80 may include means for converting mechanical actuations into electrical signals and/or altering electrical circuitry based on mechanical actuations. In one or more embodiments, circuitry 80 may include circuitry associated with and/or to facilitate the operation of at least one button and/or a microphone component(s) which may be included in control device 30. For example, circuitry 80 may include a first push button 102 (also labelled as $PB_1$), a second push button 104 (also labelled as $PB_2$) and a third push button 108 (also labelled as $PB_3$). As shown in FIGS. 11, 12 and 13, first push button 102 (also labelled as $PB_1$) may be associated with and/or facilitate the operation of first button 36; second push button 104 (also labelled as $PB_2$) and first resister 106 (also labelled as $R_1$) may be associated with and/or facilitate the operation of second button 38; third push button 108 (also labelled as $PB_3$) and second resister 110 (also labelled as $R_2$) may be associated with and/or facilitate the operation of third button 40; and so on; and microphone system 116 (also labelled as $M_1$) may be associated with and/or facilitate the operation of microphone 42.

In one or more embodiments, theoretically a limitless number of push buttons and resisters may be included in control device 30, which notion in FIGS. 11, 12 and 13 is represented as "n+1" push buttons 112 (also labelled as $PB_{n+1}$) and "n" resisters 114 (also labelled as $R_n$) where "n" may equal the total number of resisters which may be included in control device 30. Although 106, 110, and 114 are associated with and illustrated as resisters in FIGS. 11, 12 and 13, in one or more embodiments, 106, 110, and 114 may be various devices (such as, for example, transistors, diodes, integrated circuits, etc.) which may perform the function of a resister and/or other functions. In one or more embodiments, resisters and/or various devices may control the voltage across signal path 86 and/or signal path 88 as a result of their associated push buttons being actuated and/or other means. In one or more embodiments, the voltage between signal path 86 and signal path 88 may be set at different and/or the same voltage levels as may be determined and/or effected by their respective push buttons and/or other means. For example, in one or more embodiments, first push button 102 may set the voltage between signal path 86 and signal path 88 to zero and second push button 104 may set the voltage level between signal path 86 and signal path 88 to a different level as compared to the voltage level associated with first push button 102.

In one or more embodiments, the components of circuitry 80 may have an electrical connection(s) or electrical path(s) to signal path 88 and/or be grounded by various means whether reflected in FIGS. 11, 12 and 13 or not. For example, in one or more embodiments, first push button 102, second push button 104, first resister 106, third push button 108, second resister 110, "n+1" push buttons 112, "n" resisters 114, microphone system 116, and/or other components may be configured to signal path 88 and/or grounded by various means.

It should be noted that although the embodiments illustrated in FIGS. 11, 12 and 13 show certain jacks and/or signal paths configured on the opposite ends of control device 30, such configuration, in one or more embodiments, may be modified in various ways to various designs, including, for example, all and/or some jacks and/or signal paths may be configured on the same or similar end of control device 30, such as, for example, illustrated in FIGS. 1 through 10, and/or other configurations. In one or more embodiments, as shown in FIGS. 11, 12 and 13, circuitry 80 may be configured to include at least one jack configured to receive at least one plug from various devices, such as, for example, a headset and/or earbuds. As shown in FIGS. 11, 12 and 13, in one or more embodiments, the circuitry associated with the at least one jack may be configured to allow signal path 82 and/or signal path 84 to come into contact with the at least one plug configured to the device.

Although FIGS. 11, 12 and 13 may show signal flows and/or signal paths in a particular configuration, in one or more embodiments, alternative and/or additional configurations may be implemented. In one or more embodiments, other modifications may be made to the embodiment(s) illustrated in FIGS. 11, 12 and 13 which may include and/or have the capacity to utilize abilities, systems, devices, means, functionality, and/or features not expressly and/or impliedly described herein and/or illustrated in the drawings to this application but which may be obvious to one skilled in the art, whether developed later or known at the time of filing.

FIG. 11 shows one embodiment of circuitry 80 including signal path 82 and signal path 84 which may be configured to at least facilitate audio signals to ultimately flow from mobile device 10 and/or other devices to right and/or left speakers of headset 20A, headset 20C, and/or other devices (such as earbuds 20B); signal path 86 which may be configured to at least facilitate signals to flow from microphone 42 to mobile device 10 and/or other devices and/or component of control device 30; and signal path 88 which may be configured to at least facilitate grounding of various circuitry 80 components and/or other devices. FIG. 11 shows one embodiment of circuitry 80 which may include a jack 100B (also labelled as $J_2$). Jack 100B may be configured to receive plug 48A and/or plug 48E from, for example, headset 20A and/or headset 20C, respectively. Although not shown in FIG. 11, jack 100B and its related circuitry may be configured to receive and facilitate the operation of various different types of earbuds and headsets. In one or more embodiments, the circuitry associated with jack 100B may be configured so as to allow signal path 82 and/or signal path 84 to come into contact with plug 48A and/or plug 48E which may be respectively configured to headset 20A and/or headset 20C via cord 48B and/or cord 48F, respectively.

As shown in FIG. 11, circuitry 80 may include a switch 120 (also labelled as $SW_1$). Switch 120 shown in FIG. 11 is in its non-actuated state. In one or more embodiments, the circuitry associated with jack 100B may be configured so as to allow switch 120 to be actuated and/or operated when plug 48A and/or other devices are inserted into jack 100B. In one or more embodiments, when switch 120 is actuated and/or operated, it may inactivate microphone system 116 which may allow users to use a microphone associated with headset 20A (rather than microphone 116) if headset 20A includes a microphone. Although the microphone attached to headset 20A is shown in FIG. 11 as a boom microphone, any configuration of a microphone, whether developed later or known at the time of filing, may be used.

FIG. 12 shows one embodiment of circuitry 80 including signal path 82 and signal path 84 which may be configured to at least facilitate audio signals to ultimately flow from mobile device 10 and/or other devices to either a right or left speaker of earbuds 20B and/or other devices (such as headset 20C); signal path 86 which may be configured to at least facilitate signals to flow from microphone 42 to mobile device 10 and/or other devices and/or component of control device 30; and signal path 88 which may be configured to at least facilitate grounding of various circuitry 80 components and/or other devices. FIG. 12 shows one embodiment circuitry 80 which may include a jack 100A (also labelled as $J_1$). In one or more embodiments, jack 100A may be configured to receive plug 48C from, for example, earbuds 20B and/or other devices. Although not shown in FIG. 12, jack 100A and its related circuitry may be configured to receive and facilitate the operation of various different types of earbuds and headsets. In one or more embodiments, the circuitry associated with jack 100A may be configured so as to allow signal path 82 and/or signal path 84 to come into contact with plug 48C which may be configured to earbuds 20B via cord 48D.

FIG. 13 shows one embodiment of circuitry 80 including signal path 82 and signal path 84 which may be configured to at least facilitate audio signals to ultimately flow from mobile device 10 and/or other devices to either a right or left speaker of earbuds 20B and/or other devices (such as headset 20A); signal path 86 which may be configured to at least facilitate signals to flow from microphone 42 to mobile device 10 and/or other devices and/or component of control device 30; and signal path 88 which may be configured to at least facilitate grounding of various circuitry 80 components and/or other devices. FIG. 13 shows one embodiment of circuitry 80 which may including two jacks—jack 100A (configured similar to jack 100A shown and described in relation to FIG. 12) and jack 100B (configured similar to jack 100B shown and described in relation to FIG. 11). In one or more embodiments, jack 100B may be configured to receive plug 48A from, for example, headset 20A and jack 100A may be configured to receive plug 48C from, for example, earbuds 20B. Although not shown in FIG. 13, jack 100A and jack 100B and their related circuitry may be configured to receive and facilitate the operation of both, either and/or various different types of earbuds and headsets. The embodiment of circuitry 80 illustrated in FIG. 13 shows certain circuitry associated with jack 100B which may be configured so as to allow signal path 82 and/or signal path 84 to come into contact with plug 48A which may be configured to headset 20A via cord 48B, and certain circuitry associated with jack 100A which may be configured so as to allow signal path 82 and/or signal path 84 to come into contact with plug 48C which may be configured to earbuds 20B via cord 48D. The embodiment of circuitry 80 as illustrated in FIG. 13 may include a switch 120 (also labelled as $SW_1$). Like the embodiment shown in FIG. 11, switch 120 shown in FIG. 13 is in its non-actuated state. In one or more embodiments, the circuitry associated with jack 100B may be configured so as to allow switch 120 to be actuated and/or operated when plug 48A is inserted into jack 100B. In one or more embodiments, when switch 120 is actuated and/or operated, it may inactivate microphone system 116 which may allow users to use a microphone configured to headset 20A (rather than microphone 116) if headset 20A includes a microphone. Although the microphone attached to headset 20A is shown in FIG. 13 as a boom microphone, any configuration of a microphone, whether developed later or known at the time of filing, may be used.

Figure 14:
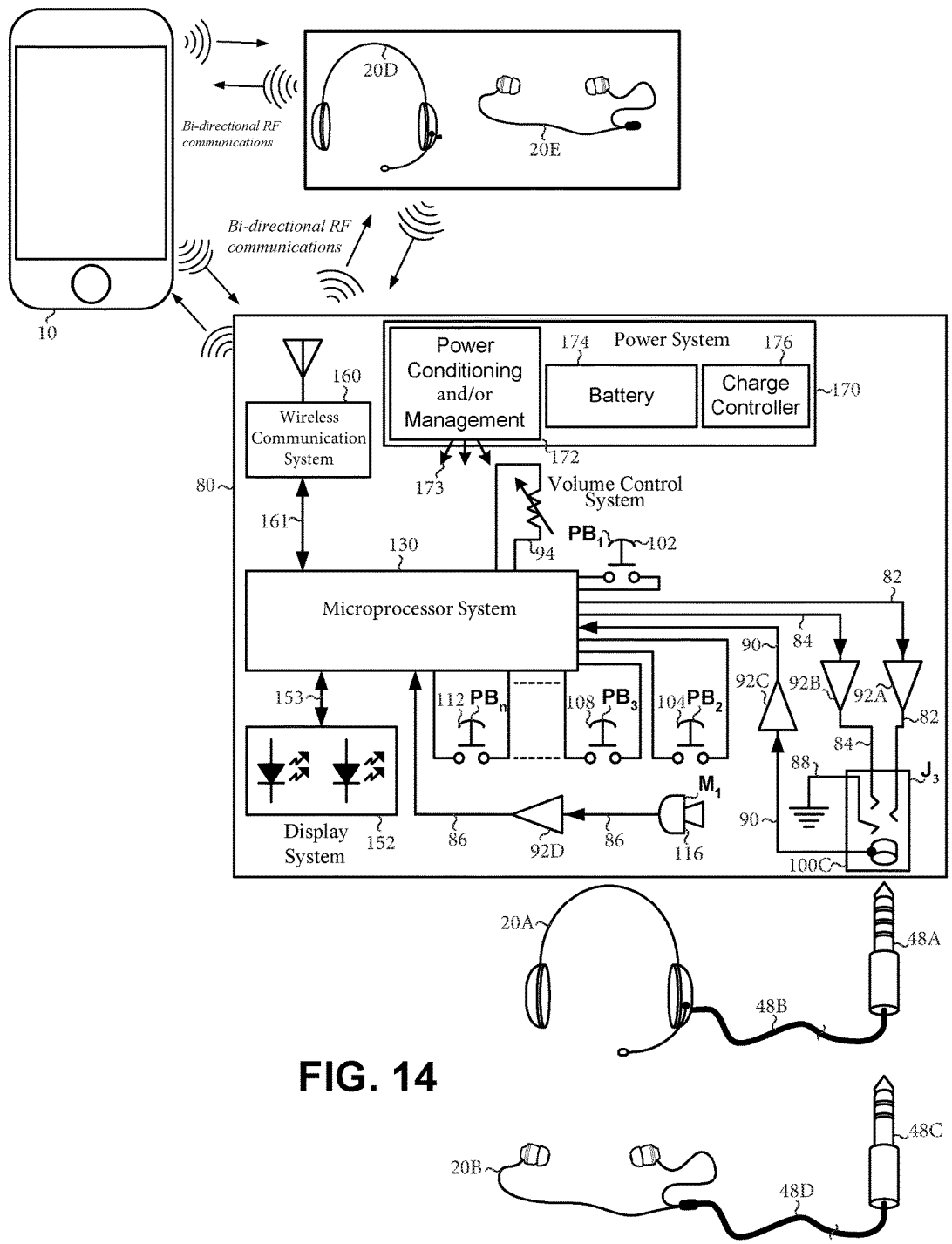
FIG. 14 is a schematic diagram of another embodiment of circuitry and other components for a control device, as well as embodiments of various devices.
Figure 15:
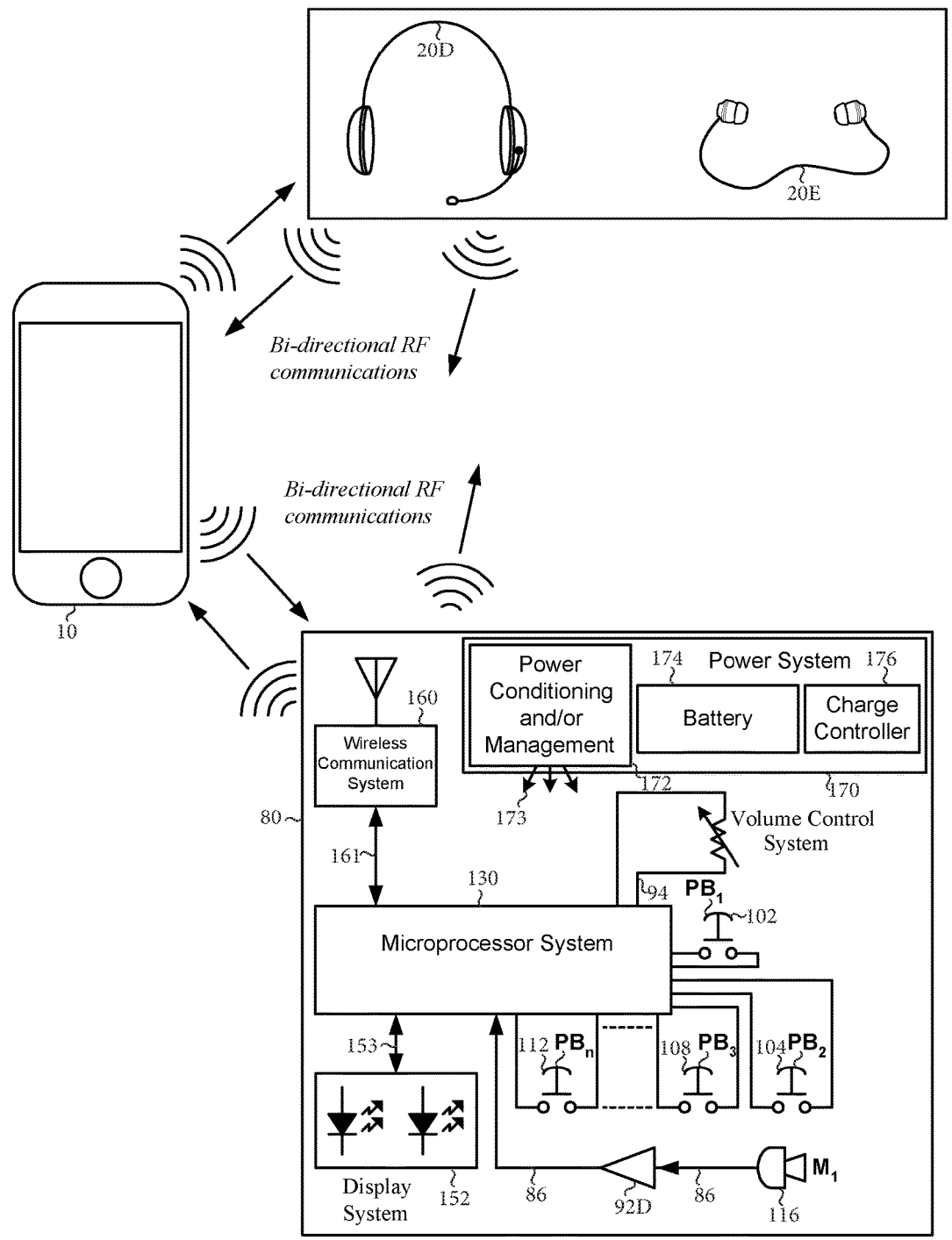
FIG. 15 is a schematic diagram of another embodiment of circuitry and other components for a control device, as well as embodiments of various devices.
Figure 16:
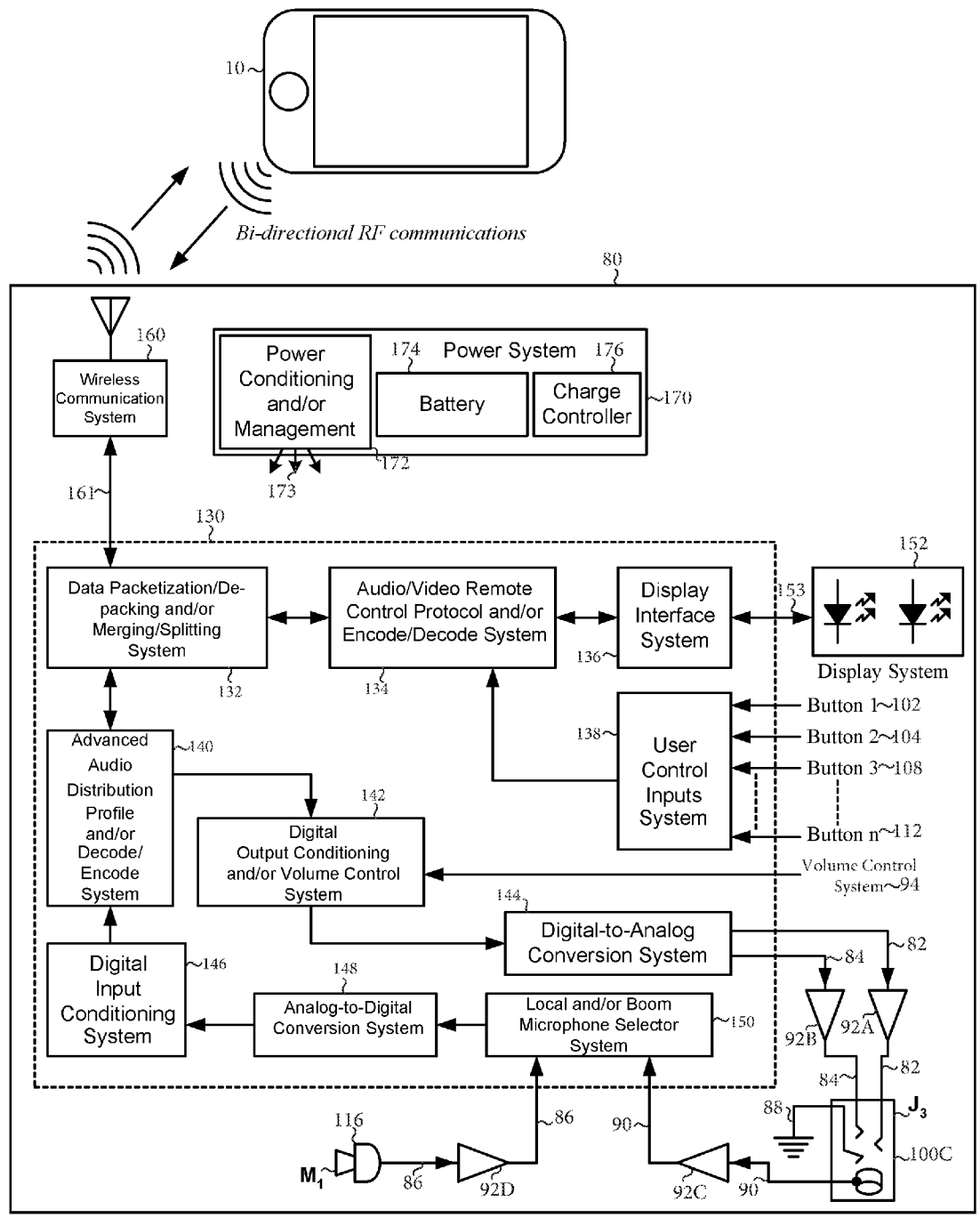
FIG. 16 is an exploded schematic diagram of a microprocessor system and other components for a control device, as well as embodiments of various devices.

FIGS. 14, 15 and 16 illustrate schematic diagrams of various embodiments of circuitry 80 and other components of control device 30 which may include, among other things, at least one microprocessor and/or at least one wireless communication system. Although FIGS. 14, 15 and 16 may show circuitry 80 in particular configurations, in one or more embodiments, alternative and/or additional configurations of circuitry 80 may be implemented. FIGS. 14, 15 and 16 also illustrate embodiments of various devices. In one or more embodiments, such as shown in FIGS. 14, 15 and 16, circuitry 80 may include a microprocessor system 130, a display system 152, a wireless communication system 160, and a power system 170.

In one or more embodiments, microprocessor system 130 and its hardware and/or software may be configured to perform various conventional and/or non-conventional operations, such as, for example: (1) receiving and/or processing (including computing) communication, instructions, signals, streams, data, information, input, etc. from various sources, including, for example, components of control device 30, mobile device 10, headset 20A, headset 20C, headset 20D, earbuds 20B, earbuds 20E, and/or other devices and systems and (2) outputting, transferring, routing, and/or signaling communication, instructions, signals, streams, data, information, input, etc. to various destinations, including, for example, components of control device 30, mobile device 10, headset 20A, headset 20C, headset 20D, earbuds 20B, earbuds 20E, and/or other devices and systems. In one or more embodiments, microprocessor system 130 may be configured so as to make the disclosure customizable and/or adaptable to meet various needs of various users in various circumstances, to make the disclosure operative, and/or to make the disclosure compatible with various systems and/or devices, whether such configurations are developed later or known at the time of filing. In one or more embodiments, microprocessor system 130 may include circuitry which may process digital signals and/or it may include an ASIC integrated circuit(s), ALUs, registers, control units, buses, and/or microprocessor(s) (also known as microcontroller), memory systems (such as, for example, primary memory (e.g. RAM, etc.), secondary memory (e.g. hard drives, CD-ROM, DVD-ROM, etc.), volatile (e.g. flash memory, etc.), non-volatile (e.g. cache memory, etc.), and/or any other device and/or means for storing data, and/or combination thereof), and/or other devices, systems, functionalities, features and/or components, whether developed later or known at the time of filing. In one or more embodiments, although FIGS. 14, 15 and 16 illustrate circuitry 80 including one microprocessor system 130, some or all of the functionality associated with microprocessor system 130, as stated, implied, and/or obvious to one skilled in the art, may be implemented by other devices (such as, for example, resisters, transistors, diodes, integrated circuits, etc.) and/or more than one microprocessors. In one or more embodiments, microprocessor system 130 may include and/or have the capacity to utilize abilities, systems, devices, means, functionality, and/or features not expressly and/or impliedly described herein and/or illustrated in the drawings to this application but which may be obvious to one skilled in the art, whether developed later or known at the time of filing.

In one or more embodiments, display system 152 and its associated hardware and/or software may be associated with and/or facilitate the operation of the interface 45 (see FIG. 10). In one or more embodiments, display system 152 may include and/or have the capacity to utilize abilities, systems, devices, means, functionality, and/or features not expressly and/or impliedly described herein and/or illustrated in the drawings to this application but which may be obvious to one skilled in the art, whether developed later or known at the time of filing.

In one or more embodiments, wireless communication system 160 and its associated hardware and/or software may be configured to include various technologies which transfers information between two or more points by wireless means, such as, for example, radio, electromagnetic, light, magnetic, electricity, sound, etc., and which may incorporate communication standards, such as, for example, Bluetooth, Zigbee, NFC, IEEE, DECT, DECT 6.0 standards, etc. and/or combinations or variants thereof, and/or other technologies, whether developed later or known at the time of filing. FIGS. 14, 15 and 16 show embodiments of wireless communication system 160 comprising a Bluetooth interface system which may include hardware and/or software which may engage in bi-directional Radio Frequency (RF) communications with various components of control device 30, mobile device 10, headset 20D, earbuds 20E, and/or other devices. In one or more embodiments, wireless communication system 160 may include abilities, systems, devices, means, functionality, and/or features not expressly and/or impliedly described herein and/or illustrated in the drawings to this application but which may be obvious to one skilled in the art, whether developed later or known at the time of filing.

In one or more embodiments, power system 170 and its associated hardware and/or software may perform various conventional and/or non-conventional operations, such as, for example, obtaining, storing, controlling, conditioning, managing, and/or facilitating the transfer of power from various sources, such as, for example, battery (such as, for example, rechargeable and/or non-rechargeable), plug-in, solar, etc., and to various destinations, such as, for example, control device 30 components and/or other systems and/or devices via, for example, signal paths 173. In one or more embodiments, power system 170 may include none, one, or more than one (such as shown in FIGS. 14, 15 and 16) of the following systems: a power conditioning and/or management system 172, a battery 174, and/or a charger controller 176. In one or more embodiments, power system 170 may include abilities, sources, systems, devices, means, functionality, and/or features not expressly and/or impliedly described herein and/or illustrated in the drawings to this application but which may be obvious to one skilled in the art, whether developed later or known at the time of filing.

FIGS. 14, 15 and 16 show embodiments of circuitry 80 including embodiments of volume control system 94 and microphone system 116. In one or more embodiments, volume control system 94 and its associated hardware and/or software may be associated with and/or facilitate the operation of volume control wheel 44. In one or more embodiments, the level of volume of audio signals communicated to components of control device 30, mobile device 10, headset 20A, headset 20C, headset 20D, earbuds 20B, earbuds 20E, and/or other devices, may be facilitated and/or controlled by a user via (1) volume control wheel 44 and/or (2) interface 45. In one or more embodiments, other signals besides and/or in addition to audio signals, may be managed, controlled and/or effected by a user operating volume control wheel 44 and/or interface 45. In one or more embodiments, volume control wheel 44 may interact with circuitry 80 (such as, via volume control system 94) to alter other types of circuitry 80 functionality (not only controlling the volume of audio signals) and/or the functionalities of other components of control device 30, mobile device 10, headset 20A, headset 20C (not shown), headset 20D, earbuds 20B, earbuds 20E, and/or other device interfacing with mobile device 10 and/or control device 30. In one or more embodiments, interface 45 may interact with circuitry 80 (such as via display system 152) to alter other types of circuitry 80 functionality (not only controlling the volume of audio signals) and/or the functionalities of other components of control device 30, mobile device 10, headset 20A, headset 20C (not shown), headset 20D, earbuds 20B, earbuds 20E, and/or other device interfacing with mobile device 10 and/or control device 30. In one or more embodiments, microprocessor system 130 may manage, control, facilitate, process, receive and/or produce communication, information, data and/or signals via volume control system 94 and/or interface 45. In one or more embodiments, volume control system 94 and/or interface 45 may include abilities, systems, devices, means, functionality, and/or features not expressly and/or impliedly described herein and/or illustrated in the drawings to this application but which may be obvious to one skilled in the art, whether developed later or known at the time of filing.

In one or more embodiments, microphone system 116 and its associated hardware and/or software may be associated with and/or facilitate the operation of microphone 42. In one or more embodiments, a user may communicate information into microphone 42 which may be communicated to microphone system 116 and ultimately to microprocessor system 130. In one or more embodiments, microprocessor system 130 may communicate information out to a user through microphone 42 via microphone system 116, mobile device 10, headset 20A, headset 20C (not shown), headset 20D, earbuds 20B, earbuds 20E, and/or any other devices interfacing with mobile device 10 and/or control device 30. In one or more embodiments, microprocessor system 130 may manage, control, facilitate, process, receive and/or produce communication, information, data and/or signals via microphone system 116, mobile device 10, headset 20A, headset 20C (not shown), headset 20D, earbuds 20B, earbuds 20E, and/or anything other devices interfacing with mobile device 10 and/or control device 30. In one or more embodiments, microphone system 116 may include abilities, systems, devices, means, functionality, and/or features not expressly and/or impliedly described herein and/or illustrated in the drawings to this application but which may be obvious to one skilled in the art, whether developed later or known at the time of filing.

In one or more embodiments, circuitry 80 may include various signal paths. In one or more embodiments, microprocessor system 130 may manage, control, facilitate, process, receive and/or produce communication, information, data and/or signals via such signal paths. In one or more embodiments, signal paths may include various technologies, such as, for example, wires and/or other means for communicating signals, whether developed later or known at the time of filing, but which may be obvious to one skilled in the art.

Although FIGS. 14, 15 and 16 may show signal flows and/or signal paths in a particular configuration, in one or more embodiments, alternative and/or additional configurations may be implemented. In one or more embodiments, various signal paths and/or other means may connect various components of microprocessor system 130 to each other and/or to other components, devices and/or systems.

In one or more embodiments, control device 30 may include abilities, systems, devices, means, and/or features which may alter electrical circuitry and/or system behavior and/or functionality based on user input. In one or more embodiments, circuitry 80 may include means for converting mechanical actuations into electrical signals and/or alter electrical circuitry based on mechanical actuations. In one or more embodiments, microprocessor system 130 may manage, control, facilitate, process, receive and/or produce communication, information, data and/or signals to and/or from control device's 30 abilities, systems, devices, means, and/or features which may alter electrical circuitry and/or system behavior and/or functionality based on user input. In one or more embodiments, user input may be accomplished by various means, such as, for example, mechanical means (such as, for example, knobs, dials, slides, buttons, switches, wheels, pads, etc.), electrical means (such as, for example, GUI nodes including text fields, buttons, toggles, etc.), audio means (such as, for example, voice recognition, etc.) and/or other means. In one or more embodiments, control device's 30 abilities, systems, devices, means, and/or features which may alter electrical circuitry and/or system behavior and/or functionality based on user input and types of user input may include abilities, systems, devices, means, functionality, and/or features not expressly and/or impliedly described herein and/or illustrated in the drawings to this application but which may be obvious to one skilled in the art, whether developed later or known at the time of filing.

In one or more embodiments, control device 30 may include various means of interfacing and/or for facilitating interoperability with various devices (such as, for example, mobile device 10, headset 20A, headset 20C, earbuds 20B, headset 20D, earbuds 20E, and/or other devices), whether said means and/or accessory devices are developed later or known at the time of filing. For example, in one or more embodiments, the means by which control device 30 may interface and/or facilitate interoperability with various devices may include one or more jacks of various kinds and types (such as, for example, jack 100A, jack 100B, and/or jack 100C) which may be configured to receive and/or be associated with one or more plugs of various kinds and types, such as, for example, 2-conductor plugs, 3-conductor plugs (such as, for example, as illustrated in FIG. 11 in plug 48E associated with headset 20C and as illustrated in FIG. 14 in plug 48C associated with earbuds 20B), 4-conductor jacks (such as, for example, as illustrated in FIG. 14 in plug 48A associated with headset 20A), etc., whether with or without microphone or other features. In one or more embodiments, the means by which control device 30 may interface and/or facilitate interoperability with various accessory devices may include, wireless connectivity (such as, for example, mobile device 10, headset 20D, earbuds 20E, wireless communication system 160, and/or other devices). Whether via jacks, wirelessly and/or other means, in one or more embodiments, the means by which control device 30 may interface and/or interoperate with various accessory devices, may include stereophonic audio signals, visual and/or audio information signals, the reception of audio signals via accessory mounted microphone(s), the reception of additional control signals from the accessory, radio frequency communications, and various other ways.

In one or more embodiments of circuitry 80, various means may be employed between and/or among systems, circuitry, signal paths, optional signal conditioning or amplification devices, microprocessors, microphones, jacks, and other elements and/or components, such that the type or style or nature or condition or components of an accessory device, may be ascertained and/or detected; and once ascertained and/or detected, circuitry 80 may be configured to alter and/or modify its functionality (such as for example, enabling or disabling the use of microphone 42 and/or alter displays on the interface 42) and/or circuitry 80 may be configured to alter and/or modify the behavior of accessory devices, such as, for example, mobile device 10, headset 20A, headset 20C, earbuds 20B, etc.

In one or more embodiments, control device 30 may be configured to receive and process wireless communication from various sources by various means. For example, in one or more embodiments, circuitry 80 may communicate wirelessly to mobile device 10 and other devices (such as, for example, wireless headset 20D, wireless earbuds 20E and/or other devices) via wireless communication system 160. In addition and/or alternatively, in one or more embodiments, circuitry 80 may communicate wirelessly to mobile device 10 and mobile device 10 may communicate wirelessly to other devices (such as, wireless headset 20D, wireless earbuds 20E, and/or other devices). In one or more embodiments, circuitry 80 may be configured to wirelessly communicate with various types of mobile devices, headsets and earbuds. In one or more embodiments, circuitry 80 may be able to detect whether devices (such as headset 20D, or some other headset or earbuds) have a microphone and then inactivate microphone 116. In one or more embodiments, once control device 30 receives and processes wireless communication from various sources by various means it may ultimately provide it to users to hear, modify, control, visualize, and/or for other purposes and/or uses. For example, once control device's 30 wireless communication system 160 receives and processes wireless communication from mobile device 10 and/or other devices (such as, headset 20D and/or earbuds 20E), the wireless communication system 160 may then communicate the processed wireless communication to its microprocessor system 130. In one or more embodiments, microprocessor system 130 may manage, control, facilitate, process, receive and/or produce communication, information, data and/or signals to and/or from various components of control device 30.

In one or more embodiments, the components of circuitry 80 may have an electrical connection(s) or electrical path(s) grounded.

In one or more embodiments, other modifications may be made to the embodiment(s) illustrated in FIGS. 14, 15 and 16 which may include and/or have the capacity to utilize abilities, systems, devices, means, functionality, and/or features not expressly and/or impliedly described herein and/or illustrated in the drawings to this application but which may be obvious to one skilled in the art, whether developed later or known at the time of filing.

FIG. 14 shows one embodiment of control device 30 which may be configured to communicate with mobile device 10, headset 20D, earbuds 20E, headset 20A, earbuds 20B and/or other devices via wireless communication and/or via at least one jack-plug combination.

FIG. 14 shows one embodiment of circuitry 80 which may include various signal paths, such as, for example, signal path 82, signal path 84, signal path 86, signal path 88, signal path 90, signal path 153, signal path 161, and/or signal paths 173. In one or more embodiments, microprocessor system 130 may manage, control, facilitate, process, receive and/or produce communication, information, data and/or signals via signal path 82, signal path 84, signal path 86, signal path 88, signal path 90, signal path 153, signal path 161, signal paths 173 and/or other signal paths. Although FIG. 14 shows signal flow only in one direction in relation to signal path 82, signal path 84, signal path 86, signal path 90, and signal paths 173, signal path 82 may be configured to facilitate the communication of audio signals from and/or to microprocessor system 130 to and/or from one or more speakers and/or microphones in headset 20A, earbuds 20B, and/or other devices; signal path 84 may be configured to facilitate the communication of audio signals from and/or to microprocessor system 130 to and/or from one or more speakers and/or microphones in headset 20A, earbuds 20B, and/or other devices; signal path 86 may be configured to facilitate the communication of signals from and/or to microprocessor system 130 to and/or from microphone 42 via microphone system 116; signal path 90 may be configured to facilitate the communication of signals from and/or to microprocessor system 130 to and/or from headset 20A, earbuds 20B, and/or other devices; and/or signal paths 173 may be configured to facilitate the communication of signals from and/or to power system 170 to and/or from components of control device 30, mobile device 10, headset 20A, earbuds 20B and/or other devices. As shown in FIG. 14, signal path 153 may be configured to facilitate the communication of signals from and/or to microprocessor system 130 to and/or from interface 45 via display system 152; and signal path 161 may be configured to facilitate the communication of signals from and/or to microprocessor system 130 to and/or from wireless communication system 160. Although FIG. 16 shows signal flows and signal paths in a particular configuration, in one or more embodiments, alternative and/or additional configurations may be implemented. In one or more embodiments, various signal paths and/or other means may connect various components of microprocessor system 130 to each other and/or to other components, devices and/or systems. In one or more embodiments, signal paths in circuitry 80 may be affected by signal conditioning and/or amplification devices. For example, as shown in FIG. 14, signal path 82 may be effected by signal conditioning and/or amplification device 92A, signal path 84 may be effected by signal conditioning and/or amplification device 92B, signal path 86 may be effected by signal conditioning and/or amplification device 92D, and signal path 90 may be effected by signal conditioning and/or amplification device 92C. Although shown in FIG. 14 only in relation to components associated with jack 100C, signal path 88 may be configured to facilitate a ground path for one or more components of control device 30.

FIG. 14 shows one embodiment of circuitry 80 which may include hardware and/or software associated with and/or to facilitate the operation of mechanical means, electrical means, audio means, and/or other means, such as, for example, first push button 102 (also labelled as $PB_1$ in FIG. 14) and related hardware and/or software may be associated with and/or facilitate the operation of first button 36; second push button 104 (also labelled as $PB_2$ in FIG. 14) and related hardware and/or software may be associated with and/or facilitate the operation of second button 38; third push button 108 (also labelled as $PB_3$ in FIG. 14) and related hardware and/or software may be associated with and/or facilitate the operation of third button 40; volume control system 94 and related hardware and/or software may be associated with and/or facilitate the operation of volume control wheel 44; microphone system 116 (also labelled as $M_1$ in FIG. 14) and related hardware and/or software may be associated with and/or facilitate the operation of microphone 42; display system 152 and related hardware and/or software may be associated with and/or facilitate the operation of a interface 45; and so on. In one or more embodiments, theoretically a limitless number of mechanical means, electrical means, audio means and/or other means may be included in control device 30, which notion is represented on FIG. 14 as "n" push buttons 112 (also labelled as $PB_n$ in FIG. 14) where "n" may equal the total number of push buttons included in control device 30. Although FIG. 14 illustrates circuitry 80 including push buttons, other mechanical means, electrical means, audio means, display means and/or other means may be substituted.

FIG. 14 shows one embodiment of circuitry 80 which may include a jack 100C (also labelled as $J_3$ in FIG. 14). In one or more embodiments, jack 100C may be configured to receive plug 48A and/or plug 48C from, for example, headset 20A and/or earbuds 20B, respectively. Although not shown in FIG. 14, jack 100C and its related circuitry may be configured to receive and/or facilitate the operation of various different types of earbuds and headsets. In one or more embodiments, the circuitry associated with jack 100C may be configured so as to allow signal path 82 and/or signal path 84 to come into contact with plug 48A and/or plug 48C which may be respectively configured to headset 20A and/or earbuds 20B via cord 48B and/or cord 48D, respectively.

FIG. 14 shows one embodiment of control device 30 which may be configured to receive and process wireless communication from various sources by various means. For example, FIG. 14 shows one embodiment of circuitry 80 which may communicate wirelessly to mobile device 10 and wireless headset 20D, wireless earbuds 20E and/or other devices, via wireless communication system 160. In addition and/or alternatively, FIG. 14 shows one embodiment of circuitry 80 which may communicate wirelessly to mobile device 10 and mobile device 10 may communicate wirelessly to wireless headset 20D, wireless earbuds 20E, and/or other devices. Although not shown in FIG. 14, circuitry 80 may be configured to wirelessly communicate with various types of mobile devices, headsets and earbuds. In one or more embodiments, circuitry 80 may be able to detect whether, for example, headset 20D, or some other headset or earbuds, has a microphone and then inactivate microphone 116. For example, in one or more embodiments, the microprocessor system 130 of FIG. 14 may be able to detect whether, for example, headset 20A, or some other headset or earbuds, has a microphone via a signal path 90 (which signal may be effected by conditioning and/or amplifying device 92C) and inactivate microphone 116 via signal path 86 (which signal may be effected by conditioning and/or amplifying device 92D).

In one or more embodiments, once control device 30 receives and processes wireless communication from various sources by various means it may ultimately provide it to users to hear, modify, control, visualize, and/or for other purposes and/or uses. For example, as shown in FIG. 14, once control device's 30 wireless communication system 160 receives and processes wireless communication from mobile device 10, headset 20D, earbuds 20E and/or other devices, the wireless communication system 160 may then communicate the processed wireless communication to its microprocessor system 130. In one or more embodiments, microprocessor system 130 may manage, control, facilitate, process, receive and/or produce communication, information, data and/or signals to and/or from various components of control device 30. For example, as shown in FIG. 14, microprocessor system 130 may be configured to manage, control, facilitate, process, receive and/or produce communication, information, data and/or signals to and/or from: headset 20A and/or earbuds 20B via signal path 82 and/or signal path 84, respectively; wireless communication system 160 and signal path 161; mobile device 10 via wireless communication system 160 and signal path 161; headset 20D and/or earbuds 20E via wireless communication system 160 via signal path 161; volume control wheel 44 via volume control system 94; interface 45 via display system 152 and signal path 153; microphone 42 via microphone system 116 and signal path 86; power system 170 via signal paths 173; signal path 90; jack 100C; first button 36 via first push button 102; second button 38 via second push button 104; third button 40 via third push button 108, and/or other sources and/or combinations of sources, whether components of control device 30 and/or accessory devices, whether expressly stated herein or not; and/or whether illustrated in the drawings or not, but which may be obvious to one skilled in the art.

Whether reflected in FIG. 14 or not, in one or more embodiments, the components of circuitry 80 may have an electrical connection(s) or electrical path(s) to signal path 88 and/or otherwise be grounded.

FIG. 15 shows one embodiment of control device 30 which may be configured to communicate with mobile device 10, headset 20D, earbuds 20E and/or other devices via wireless communication means and without a jack-plug combination.

FIG. 15 shows one embodiment of circuitry 80 which may include various signal paths, such as, for example, signal path 86, signal path 153, signal path 161, and/or signal paths 173. In one or more embodiments, microprocessor system 130 may manage, control, facilitate, process, receive and/or produce communication, information, data and/or signals via signal path 86, signal path 153, signal path 161, signal paths 173 and/or other signal paths. Although FIG. 15 shows signal flow only in one direction in relations to signal path 86 and signal paths 173; signal path 86 may be configured to facilitate the communication of signals from and/or to microprocessor system 130 to and/or from microphone 42 via microphone system 116; and/or signal paths 173 may be configured to facilitate the communication of signals from and/or to power system 170 to and/or from components of control device 30, mobile device 10, headset 20D, earbuds 20E and/or other devices. As shown in FIG. 15, signal path 153 may be configured to facilitate the communication of signals from and/or to microprocessor system 130 to and/or from interface 45 via display system 152; and signal path 161 may be configured to facilitate the communication of signals from and/or to microprocessor system 130 to and/or from wireless communication system 160. Although FIG. 16 shows signal flows and signal paths in a particular configuration, in one or more embodiments, alternative and/or additional configurations may be implemented. In one or more embodiments, various signal paths and/or other means may connect various components of microprocessor system 130 to each other and/or to other components, devices and/or systems. In one or more embodiments, signal paths in circuitry 80 may be affected by signal conditioning and/or amplification devices. For example, as shown in FIG. 15 signal path 86 may be affected by signal conditioning and/or amplification device 92D. Although not necessarily show in FIG. 15, signal path 88 may be configured to facilitate a ground path for one or more components of control device 30.

FIG. 15 shows one embodiment of circuitry 80 which may include hardware and/or software associated with and/or to facilitate the operation of mechanical means, electrical means, audio means, and/or other means, such as, for example, first push button 102 (also labelled as $PB_1$ in FIG. 15) and related hardware and/or software may be associated with and/or facilitate the operation of first button 36; second push button 104 (also labelled as $PB_2$ in FIG. 15) and related hardware and/or software may be associated with and/or facilitate the operation of second button 38; third push button 108 (also labelled as $PB_3$ in FIG. 15) and related hardware and/or software may be associated with and/or facilitate the operation of third button 40; volume control system 94 and related hardware and/or software may be associated with and/or facilitate the operation of volume control wheel 44; microphone system 116 (also labelled as $M_1$ in FIG. 15) and related hardware and/or software may be associated with and/or facilitate the operation of microphone 42; display system 152 and related hardware and/or software may be associated with and/or facilitate the operation of a interface 45; and so on. In one or more embodiments, theoretically a limitless number of mechanical means, electrical means, audio means and/or other means may be included in control device 30, which notion is represented on FIG. 15 as "n" push buttons 112 (also labelled as $PB_n$ in FIG. 15) where "n" may equal the total number of push buttons included in control device 30. Although FIG. 15 illustrates circuitry 80 including push buttons, other mechanical means, electrical means, audio means, display means and/or other means may be substituted.

FIG. 15 shows one embodiment of control device 30 which may be configured to receive and process wireless communication from various sources by various means. For example, FIG. 15 shows one embodiment of circuitry 80 which may communicate wirelessly to mobile device 10 and wireless headset 20D, wireless earbuds 20E and/or other devices, via wireless communication system 160. In addition and/or alternatively, FIG. 15 shows one embodiment of circuitry 80 which may communicate wirelessly to mobile device 10 and mobile device 10 may communicate wirelessly to wireless headset 20D, wireless earbuds 20E, and/or other devices. Although not shown in FIG. 15, circuitry 80 may be configured to wirelessly communicate with various types of mobile devices, headsets and earbuds. In one or more embodiments, circuitry 80 may be able to detect whether, for example, headset 20D, or some other headset or earbuds, has a microphone and then inactivate microphone 116. For example, in one or more embodiments, the microprocessor system 130 of FIG. 15 may be configured to be able to detect whether, for example, headsets or earbuds interfacing with control device 30 have a microphone and then inactivate microphone 116 via signal path 86 (which signal may be affected by conditioning and/or amplifying device 92D).

In one or more embodiments, once control device 30 receives and processes wireless communication from various sources by various means it may ultimately provide it to users to hear, modify, control, visualize, and/or for other purposes and/or uses. For example, as shown in FIG. 15, once control device's 30 wireless communication system 160 receives and processes wireless communication from mobile device 10, headset 20D, earbuds 20E and/or other devices, the wireless communication system 160 may then communicate the processed wireless communication to its microprocessor system 130. In one or more embodiments, microprocessor system 130 may manage, control, facilitate, process, receive and/or produce communication, information, data and/or signals to and/or from various components of control device 30. For example, as shown in FIG. 15, microprocessor system 130 may be configured to manage, control, facilitate, process, receive and/or produce communication, information, data and/or signals to and/or from: wireless communication system 160 and signal path 161; mobile device 10 via wireless communication system 160 and signal path 161; headset 20D and/or earbuds 20E via wireless communication system 160 via signal path 161; volume control wheel 44 via volume control system 94; interface 45 via display system 152 and signal path 153; microphone 42 via microphone system 116 and signal path 86; power system 170 via signal paths 173; first button 36 via first push button 102; second button 38 via second push button 104; third button 40 via third push button 108, and/or other sources and/or combinations of sources, whether components of control device 30 and/or accessory devices, whether expressly stated herein or not; and/or whether illustrated in the drawings or not, but which may be obvious to one skilled in the art.

Whether reflected in FIG. 15 or not, in one or more embodiments, the components of circuitry 80 may have a grounded electrical connection(s) or electrical path(s).

In one or more embodiment, the circuitry 80 of FIG. 15 may be designed to include each and every aspect, feature and functionality as described and/or associated with the embodiment as illustrated, described and/or related to FIG. 14 in anyway, all of which are hereby incorporated herein to the description relating to FIG. 15 by reference as if set forth in full, excepting only those pertaining to the following devices and signal paths: jack 100C, signal path 82, signal path 84, signal path 90, signal conditioning and/or amplification device 92A, signal conditioning and/or amplification device 92B, signal conditioning and/or amplification device 92C and/or signal path 88. Notwithstanding said devices and signal paths are not expressly illustrated in FIG. 15, in one or more embodiments, the aspects, features and/or functionality associated with said devices and signal paths may be available in the embodiments illustrated in FIG. 15, albeit, in one or more embodiments, such may be provide by different means. For example, in one or more embodiments, microprocessor system 130 may process and send and/or receive communication which may have been accomplished via jack 100C, signal path 82, signal path 84, signal path 90, signal conditioning and/or amplification device 92A, signal conditioning and/or amplification device 92B, signal conditioning and/or amplification device 92C and/or signal path 88, to and/or from other systems which may perform the same and/or similar functions, such as, for example, wireless communication system 160 and ultimately to and/or from mobile device 10, headset 20D, earbuds 20E and/or other devices.

FIG. 16 shows an expanded view of one embodiment of microprocessor system 130. The embodiments of microprocessor system 130 as illustrated and described in relation to FIGS. 14 and/or 15 may be implemented in whole, in part, or not by the microprocessor system 130 illustrated and described in relation to FIG. 16. Although not shown in full, the microprocessor system 130 of FIG. 16 may be designed to interact with various accessory devices (such as mobile device 10, headset 20D, earbuds 20E, headset 20A, earbuds 20B and/or other devices) via at least one jack-plug combination and/or via at least one wireless communication system and/or other means.

FIG. 16 shows one embodiment of microprocessor system 130 which may include various conventional and/or non-conventional components, such as, the following: a data packetization/de-packing and/or merging/splitting system 132, an audio/video remote control protocol and/or encode/decode system 134, a display interface system 136, a user control inputs system 138, an advanced audio distribution profile and/or decode/encode system 140, a digital output conditioning and/or volume control system 142, a digital-to-analog conversion system 144, a digital input conditioning system 146, an analog-to-digital conversion system 148, and/or a local and/or boom microphone selector system 150. Although processes mentioned in the previous sentence may be labelled in FIG. 16 to indicate possible functionality, in one or more embodiments, other functionality may be performed by such processes and the labels in FIG. 16 (and elsewhere) should not be interpreted to limit any systems functionality. In one or more embodiments, implementation of microprocessor system 130 may include none, one, more than one of the above stated and illustrated processes/systems and/or other processes/systems and may be configurable, adaptable and customizable to meet the various needs of various users in various circumstances. Microprocessor system 130 may include abilities, systems, devices, means, functionality, and/or features not expressly and/or impliedly described herein and/or illustrated in the drawings to this application but which may be obvious to one skilled in the art, whether developed later or known at the time of filing.

Referring to FIG. 16, in one or more embodiments, wireless communication may be transmitted between and/or among wireless communication system 160 (which may be accomplished by various means, including, for example, Bluetooth interface bi-directional Radio Frequency ("RF") communication technology or some other technology) and various devices (such as, for example, mobile device 10, headset 20D (not shown), earbuds 20E (not shown), and/or other devices) and various components of control device 30 (such as, for example, microprocessor system's 130 data packetization/de-packing and/or merging/splitting system 132). In one or more embodiments, wireless communication system 160 may handle Bluetooth protocol, encrypt data, correct error, and/or otherwise process communication for various purposes and send and/or receive communication to and/or from various systems, including, for example, various devices (such as, for example, mobile device 10, headset 20D (not shown), earbuds 20E (not shown), and/or other devices) and various components of control device 30 (such as, for example, microprocessor system's 130 data packetization/de-packing and/or merging/splitting system 132). Although not shown in FIG. 16, in one or more embodiments, circuitry 80 may communicate wirelessly to mobile device 10 and mobile device 10 may communicate wirelessly to wireless headset 20D, wireless earbuds 20E, and/or other devices. Although not shown in FIG. 16, in one or more embodiments, circuitry 80 may be configured to wirelessly communicate with various types of mobile devices, headsets and earbuds. Although not shown in FIG. 16, in one or more embodiments, circuitry 80 may be able to detect whether, for example, headset 20D, or some other headset or earbuds, has a microphone and then inactivate microphone 116. For example, in one or more embodiments, the microprocessor system 130 of FIG. 16 may be able to detect whether, for example, headset 20A (not shown), or some other headset or earbuds, has a microphone via a signal path 90 (which signal may be effected by conditioning and/or amplifying device 92C) and inactivate microphone 116 via signal path 86 (which signal may be effected by conditioning and/or amplifying device 92D). In one or more embodiments, once control device 30 receives and processes wireless communication from various sources by various means it may ultimately provide it to users to hear, modify, control, visualize, and/or for other purposes and/or uses. For example, as shown in FIG. 16, once control device's 30 wireless communication system 160 receives and processes wireless communication from mobile device 10, headset 20D (not shown), earbuds 20E (not shown) and/or other devices, the wireless communication system 160 may then communicate the processed wireless communication to its microprocessor system 130. In one or more embodiments, microprocessor system 130 may manage, control, facilitate, process, receive and/or produce communication, information, data and/or signals to and/or from various components of control device 30. For example, as shown in FIG. 16, microprocessor system 130 may be configured to manage, control, facilitate, process, receive and/or produce communication, information, data and/or signals to and/or from: headset 20A (not shown) and/or earbuds 20B (not shown) via signal path 82 and/or signal path 84, respectively; wireless communication system 160 and signal path 161; mobile device 10 via wireless communication system 160 and signal path 161; headset 20D (not shown) and/or earbuds 20E (not shown) via wireless communication system 160 via signal path 161; volume control wheel 44 via volume control system 94; interface 45 via display system 152 and signal path 153; microphone 42 via microphone system 116 and signal path 86; power system 170 via signal paths 173; signal path 90; jack 100C; first button 36 via first push button 102; second button 38 via second push button 104; third button 40 via third push button 108, and/or other sources and/or combinations of sources, whether components of control device 30 and/or accessory devices, whether expressly stated herein or not; and/or whether illustrated in the drawings or not, but which may be obvious to one skilled in the art.

In one or more embodiments, data packetization/de-packing and/or merging/splitting system 132 may de-pack, split, packetize, merge and/or otherwise process communication for various purposes and send and/or receive communication to and/or from various systems, including, for example, wireless communication system 160, audio/video remote control protocol and/or encode/decode system 134 and/or advanced audio distribution profile and/or decode/encode system 140.

In one or more embodiments, audio/video remote control protocol and/or encode/decode system 134 may encode, decode and/or otherwise process communication for various purposes (such as, for example, in order to facilitate a user's remote control of other devices) and send and/or receive communication to and/or from various systems, including, for example, data packetization/de-packing and/or merging/splitting system 132, display interface 136, user control inputs systems 138, and/or volume control system 94.

In one or more embodiments, display interface 136 may generate displays, interface with other systems, and/or otherwise process communication for various purposes and send and/or receive communication to and/or from various systems, including, for example, display system 152. In one or more embodiments, display system 152 may process communication for various purposes and send and/or receive communication to and/or from various systems and/or be associated with and/or facilitate the operation of interface 45 wherein a user may view, manipulate and/or perform various functions such as, for example, selecting media controls (such as, for example, volume control, title selection, play, pause, stop, fast forward, next, rewind, previous, etc.), phone functionalities (such as, for example, answer, hang-up, dial, call, hold, mute, etc.) and/or other functions.

In one or more embodiments, user control inputs systems 138 may convert mechanical actuations into electrical signals and/or alter electrical circuitry based on mechanical actuations and/or otherwise process communication for various purposes and send and/or receive communication from various systems, such as, for example, elements of circuitry 80 which may include hardware and/or software associated with mechanical means, electrical means, audio means, and/or other means, such as, for example, first push button 102 (also labelled as "Button 1" in FIG. 16) which may be associated with and/or facilitate the operation of first button 36; second push button 104 (also labelled as "Button 2" in FIG. 16) which may be associated with and/or facilitate the operation of second button 38; third push button 108 (also labelled as "Button 3" in FIG. 16) which may be associated with and/or facilitate the operation of third button 40; and/or various other buttons and/or means (in one or more embodiments, theoretically a limitless number of mechanical means, electrical means, audio means and/or other means may be included in control device 30, which notion is represented on FIG. 16 as "Button n", where "n" may equal the total number of push buttons included in control device 30). Although FIG. 16 illustrates circuitry 80 including push buttons, other mechanical means, electrical means, audio means, display means and/or other means may be substituted.

In one or more embodiments, volume control system 94 may convert mechanical actuations into electrical signals and/or alter electrical circuitry based on mechanical actuations and/or otherwise process communication for various purposes and send and/or receive communication to and/or from various systems (such as, for example, audio/video remote control protocol and/or encode/decode system 134 and/or digital output conditioning and/or volume control system 142) and/or be associated with and/or facilitate the operation of volume control wheel 44 wherein a user may control the level of audio signals and/or other functions.

In one or more embodiments, advanced audio distribution profile and/or decode/encode system 140 may decode and/or encode communication, manage signal streams, and otherwise process communication for various purposes and send and/or receive communication to and/or from various systems, such as, for example, data packetization/de-packing and/or merging/splitting system 132, digital output conditioning and/or volume control system 142 and/or digital input conditioning system 146.

In one or more embodiments, digital output conditioning and/or volume control system 142 may condition communication, perform compression, amplification, equalization, filter, and/or noise reduction related functions, and otherwise process communication for various purposes and send and/or receive communication to and/or from various systems, such as, for example, volume control system 94, digital-to-analog conversion system 144 and/or advanced audio distribution profile and/or decode/encode system 140.

In one or more embodiments, digital-to-analog conversion system 144 may convert digital signals to analog signals and otherwise process communication for various purposes (such as, for example, preparing signals to ultimately be heard by a user) and send and/or receive communication to and/or from various systems, such as, for example, digital output conditioning and/or volume control system 142, signal path 82, signal path 84, and/or ultimately headset 20A (not shown in FIG. 16), earbuds 20B (not shown in FIG. 16), and/or other devices, and/or wireless communication system 160 and ultimately mobile device 10, headset 20D (not shown in FIG. 16), earbuds 20E (not shown in FIG. 16) and/or other devices (although not shown in FIG. 16).

In one or more embodiments, digital input conditioning system 146 may condition communication, perform compression, amplification, equalization, filter, and/or noise reduction related functions, and otherwise process communication for various purposes and send and/or receive communication to and/or from various systems, such as, for example, advanced audio distribution profile and/or decode/encode system 140 and/or analog-to-digital conversion system 148.

In one or more embodiments, analog-to-digital conversion system 148 may convert analog signals to digital signals and otherwise process communication for various purposes, including, for example, converting signals from users into a format which may be processed by control device 30, and send and/or receive communication to and/or from various systems, such as, for example, digital input conditioning system 146 and/or local and/or boom microphone selector system 150.

In one or more embodiments, local and/or boom microphone selector system 150 may detect various functionalities of devices (such as, for example, whether a headset has a boom microphone or not) and/or modify various functionality of circuitry 80 accordingly (such as, for example, inactivating microphone system 116 and/or the available use of microphone 42 in the instance when a headset has a built-in microphone that may be used instead of microphone 42), and send and/or receive communication to and/or from various systems, such as, for example, microphone system 116 (also labelled as $M_1$ in FIG. 16) and which may be associated with and/or facilitate the operation of microphone 42), jack 100C, and/or wireless communication system 160, mobile device 10, headset 20D (not shown), earbuds 20E (not shown) and/or other devices.

FIG. 16 shows one embodiment of circuitry 80 which may include various signal paths, such as, for example, signal path 82, signal path 84, signal path 86, signal path 88, signal path 90, signal path 153, signal path 161, and/or signal paths 173. In one or more embodiments, microprocessor system 130 may manage, control, facilitate, process, receive and/or produce communication, information, data and/or signals via signal path 82, signal path 84, signal path 86, signal path 88, signal path 90, signal path 153, signal path 161, signal paths 173 and/or other signal paths. Although FIG. 16 shows signal flow only in one direction in relations to signal path 82, signal path 84, signal path 86, signal path 90, and signal paths 173, signal path 82 may be configured to facilitate the communication of audio signals from and/or to microprocessor system 130 to and/or from one or more speakers and/or microphones in headset 20A (not shown), earbuds 20B (not shown), and/or other devices; signal path 84 may be configured to facilitate the communication of audio signals from and/or to microprocessor system 130 to and/or from one or more speakers and/or microphones in headset 20A (not shown), earbuds 20B (not shown), and/or other devices; signal path 86 may be configured to facilitate the communication of signals from and/or to microprocessor system 130 to and/or from microphone 42 via microphone system 116; signal path 90 may be configured to facilitate the communication of signals from and/or to microprocessor system 130 to and/or from headset 20A (not shown), earbuds 20B (not shown), and/or other devices; and/or signal paths 173 may be configured to facilitate the communication of signals from and/or to power system 170 to and/or from components of control device 30, mobile device 10, headset 20A (not shown), earbuds 20B (not shown)and/or other devices. As shown in FIG. 16, signal path 153 may be configured to facilitate the communication of signals from and/or to microprocessor system 130 to and/or from interface 45 via display system 152; and signal path 161 may be configured to facilitate the communication of signals from and/or to microprocessor system 130 to and/or from wireless communication system 160. Although FIG. 16 shows signal flows and signal paths in a particular configuration, in one or more embodiments, alternative and/or additional configurations may be implemented. In one or more embodiments, various signal paths and/or other means may connect various components of microprocessor system 130 to each other and/or to other components, devices and/or systems. In one or more embodiments, signal paths in circuitry 80 may be affected by signal conditioning and/or amplification devices. For example, as shown in FIG. 16 signal path 82 may be effected by signal conditioning and/or amplification device 92A, signal path 84 may be effected by signal conditioning and/or amplification device 92B, signal path 86 may be effected by signal conditioning and/or amplification device 92D, and signal path 90 may be effected by signal conditioning and/or amplification device 92C. Although only shown in FIG. 16 in relation to components associated with jack 100C, signal path 88 may be configured to facilitate a ground path for one or more components of control device 30.

FIG. 16 shows one embodiment of circuitry 80 which may include a jack 100C. In one or more embodiments, jack 100C may be configured to receive plug 48A (not shown) and/or plug 48C (not shown) from, for example, headset 20A (not shown) and/or earbuds 20B (not shown), respectively. Although not shown in FIG. 16, jack 100C and its related circuitry may be configured to receive and/or facilitate the operation of various different types of earbuds and headsets. In one or more embodiments, the circuitry associated with jack 100C may be configured so as to allow signal path 82 and/or signal path 84 to come into contact with plug 48A (not shown) and/or plug 48C (not shown) which may be respectively configured to headset 20A (not shown) and/or earbuds 20B (not shown) via cord 48B (not shown) and/or cord 48D (not shown), respectively.

Whether reflected in FIG. 16 or not, in one or more embodiments, the components of circuitry 80 may have an electrical connection(s) or electrical path(s) to be grounded.

In one or more embodiments, a user may use control device 30 for various reasons, to perform various functions, and in various ways.

Figure 17:
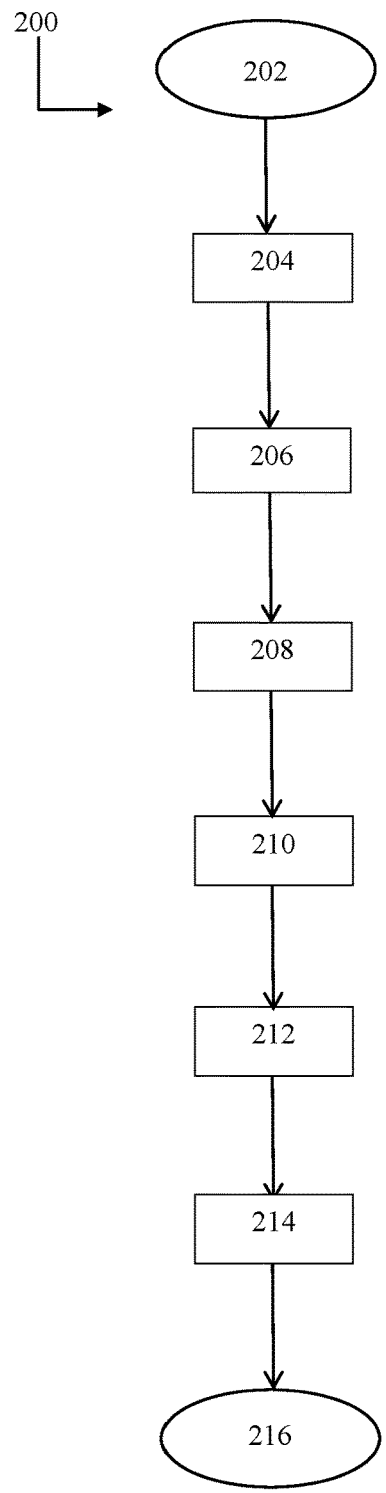
FIG. 17 is a flow diagram that depicts one embodiment of a method for using a control device.

FIG. 17 is a flow diagram that depicts one embodiment of a method 200 for using control device 30 for communicating with a mobile device (such as mobile device 10) and a headset (such as headset 20A, headset 20C, headset 20D, earbuds 20B, and/or earbuds 20E) in accordance with one embodiment. The method 200 for using control device 30 as illustrated in flow diagram FIG. 17 may be customized, flexible and adapted to various circumstances and situations.

Prior to entering step 202, the user may perform the following tasks in any order: the user may secure control device 30 onto his or her person, clothing and/or equipment; the user may connect (wirelessly or otherwise) control device 30 to a mobile device (such as mobile device 10); the user may connect (wirelessly or otherwise) control device 30 to a headset (such as headset 20A, headset 20C, headset 20D, earbuds 20B and/or earbuds 20E); the user may dress for the sport and/or other activity, such as placing gloves or other equipment on his or her hands; and the user may select music to listen to which audio signals may be communicated from mobile device 10 to the control device 30 which communicates to the headset.

In step 202, a user enters the process and may be listening to audio signals communicated from mobile device 10 to the control device 30 which communicates the audio signals to the headset while the user may be engaging in a sport and/or activity.

In step 204, an incoming call may arrive at the mobile device 10.

In step 206, the audio signals being communicated to the user prior to the arrival of the call may be automatically stopped, paused or muted.

In step 208, the user may manipulate at least one button on control device 30 while wearing gloves or other equipment to take the incoming call.

In step 210, the user may speak into microphone 42 on control device 30 to communicate with the caller and may hear the caller through microphone 42 or the headset.

In step 212, the call may terminate when the caller hangs up or when the user manipulates at least one button on control device 30.

In step 214, the audio signals may automatically resume being communicated to the user from mobile device 10 to the control device 30 which communicates the audio signals to the headset.

Figure 18:
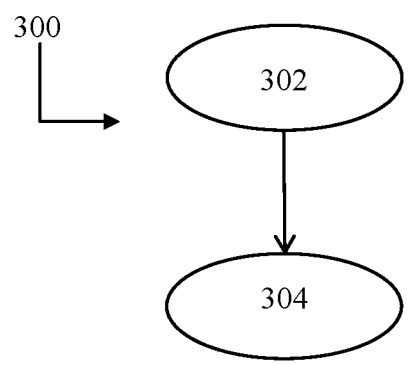
FIG. 18 is a flow diagram that depicts one embodiment of another method for using a control device.

FIG. 18 is a flow diagram that depicts one embodiment of a method 300 for using control device 30 for communicating with a mobile device (such as mobile device 10) and a headset (such as headset 20A, headset 20C, headset 20D, earbuds 20B, and/or earbuds 20E) in accordance with one embodiment. The method 300 for using control device 30 as illustrated in flow diagram FIG. 18 may be customized, flexible and adapted to various circumstances and situations.

Prior to entering step 302, the user may perform the following tasks in any order: the user may secure control device 30 onto his or her person, clothing and/or equipment; the user may connect (wirelessly or otherwise) control device 30 to a mobile device (such as mobile device 10); the user may connect (wirelessly or otherwise) control device 30 to a headset (such as headset 20A, headset 20C, headset 20D, earbuds 20B and/or earbuds 20E); the user may dress for the sport and/or other activity, such as placing gloves or other equipment on his or her hands; and the user may select music to listen to which audio signals may be communicated from mobile device 10 to the control device 30 which communicates to the headset.

In step 302, a user enters the process and may be listening to audio signals communicated from mobile device 10 to the control device 30 which communicates the audio signals to the headset while the user may be engaging in a sport and/or activity.

In step 304, the user may manipulate at least one button on control device 30 while wearing gloves or other equipment to modify the audio signals being communicated from mobile device 10 to the control device 30 which communicates the audio signals to the headset. In one or more embodiments, modification of the audio signal may include at least one of the following: play music, pause music, stop music, mute music, fast forward music, rewind music, skip a song, shuffle music, select music, control the speed of audio communication, and/or control the volume of audio communication. This step may be repeated as desired.

In one or more embodiments, a user may use control device 30 in alternative and/or additional ways. For example, in one or more embodiments, a user may secure control device 30 onto his or her person, clothing and/or equipment (such as, for example, ski gloves); if a user hasn't already connected mobile device 10 to control device 30 and/or connected earbuds 20B to control device 30, a user may do so and/or if a user isn't already engaging in an activity, a user may start engaging in an activity; and a user may operate control device 30 and/or mobile device 10 (for example, a user may select a song to listen to by clicking on the applicable button(s), selecting the applicable display feature(s) and/or saying the applicable voice command(s) associated with control device 30 which may interact with mobile device 10 to carry out the action(s) requested, or in addition or alternatively, a user may place and/or take a call by clicking on the applicable button(s), selecting the applicable display feature(s) and/or saying the applicable voice command(s) associated with control device 30 which may interact with mobile device 10 to carry out the action(s) requested and the user may speak into a microphone associated with control device 30 to communicate with the person on the other end of the call).

In one or more embodiments, a user may desire to engage in a variety of activities and dresses in applicable clothing and/or equipment; a user may obtain control device 30, mobile device 10 and earbuds 20B (or another device); a user may clip or otherwise secure control device 30 onto his or her clothing and/or equipment sufficient enough so that it may not fall off said clothing and/or equipment while engaging in an activity; a user may connect mobile device 10 to control device 30; a user may connect earbuds 20B to control device 30; a user may turn on control device 30 and/or mobile device 10; a user may select a song to listen to by clicking on the applicable button(s), selecting the applicable display feature(s) and/or saying the applicable voice command(s) associated with control device 30 which may interact with mobile device 10 to carry out the action(s) requested and which song may begin to play though earbuds 20B; a user may start engaging in an activity; a user may select a different song while engaged in the activity and wearing control device 30 and wearing clothing and/or equipment associated with the activity (such as, for example, ski gloves) by clicking on the applicable button(s), selecting the applicable display feature(s) and/or saying the applicable voice command(s) associated with control device 30 which may interact with mobile device 10 to carry out the action(s) requested and which song may begin to play though earbuds 20B; a user may place and/or take a call by clicking on the applicable button(s), selecting the applicable display feature(s) and/or saying the applicable voice command(s) associated with control device 30 which may interact with mobile device 10 to carry out the action(s) requested and the audio of which may sound though earbuds 20B and the user may speak into a microphone associated with control device 30 to communicate with the person on the other end of the call; a user may end a call by clicking on the applicable button(s), selecting the applicable display feature(s) and/or saying the applicable voice command(s) associated with control device 30 which may interact with mobile device 10 to carry out the action(s) requested; and/or a user may resume listening to music automatically upon ending the call and/or by clicking on the applicable button(s), selecting the applicable display feature(s) and/or saying the applicable voice command(s) associated with control device 30 which may interact with mobile device 10 to carry out the action(s) requested.

In one or more embodiments, a user may secure control device 30 onto the user's clothing via the securement mechanism; the user connect mobile device 10 to control device 30; the user may connect earbuds 20B to control device 30; the user may wear gloves on his or her hands while engaging in an activity; and the user, while wearing the gloves, may manipulate the control device 30.

In one or more embodiments, a user may plug control device 30 into a headset (such as, earbuds, headphones and/or other sound system) using a first cord. A user may plug control device 30 into mobile device 10 (such as, a mobile phone, mp3 player, and/or other audio device) a second cord. First and second cords may be long enough to be routed through the user's sleeve if user chooses. If a user so chooses, the cords may be routed through the user's sleeve in any way preferable to user. The user may turn on mobile device 10 and select music and other apps the user may choose to hear through the headset. The user may set the volume of the music to a desired level. The user may attach control device 30 to a sleeve, coat collar, arm, wrist, pocket and/or wherever user chooses to attach or carry the control device 30 on his or her person, clothing and/or equipment. The user manipulates at least one button to "play" the music. The music may automatically be "paused" when a call comes into mobile device 10. The user may push at least one button to answer incoming calls. A user may speak directly into microphone 42 on the control device 30 to communicate with the caller and hear the caller's voice through the user's headset. The music may automatically resume when the call is terminated. The control device may be removed when the user is finished using control device 30. Control device 30 may be stored easily in a pocket, backpack, equipment bag and/or wherever user chooses to attach or carry the control device 30. Control device 30 may be durable enough to be safely stored in any type of equipment bag with other equipment such as ski boots, helmets, etc.

Different embodiments of the disclosure may implement the above scenarios and/or variations of the above scenarios. In one or more embodiment, any of the structures, functions, and/or features of any aspect of the disclosure may be combined with any of the structures, functions, and/or features of any other aspect of the disclosure. In one or more embodiments, each component of the disclosures may be provided in any color.

In one or more embodiments, other modifications may be made to the embodiments illustrated in the drawings and/or otherwise disclosed herein and/or equivalents, which may include and/or have the capacity to utilize abilities, systems, devices, articles, means, functionality, features, methods and/or uses not expressly and/or impliedly described herein and/or illustrated in the drawings to this application but which may be obvious to one skilled in the art, whether developed later or known at the time of filing.

It should be understood that the present systems, devices, means, methods and structures are not intended to be limited to the particular forms disclosed; rather, they are to cover all combinations, modifications, equivalents and alternatives. A system, device, article, means, method or structure that is configured in a certain way may be configured in at least that way, but may also be configured in ways that are not described or illustrated. The disclosure may be configured to function with a variety of systems, devices, means, methods, and structures. Different materials may be used for individual components. Different materials may be combined in a single component.

The present disclosure may be embodied in other specific forms without departing from its spirit or essential characteristics. It is appreciated that various features of the above described examples and embodiments may be mixed and matched to form a variety of other combinations and alternatives. It is also appreciated that devices, methods and systems disclosed herein should not be limited simply to control devices, methods and systems. The described embodiments are to be considered in all respects as illustrative and not restrictive. Other embodiments and/or implementations are within the scope of the following claims and at least all changes which come within the meaning and range of equivalency of the claims are to be embraced within their scope. The scope of the disclosure may be indicated by the appended claims rather than by any of the foregoing description.

What is claimed is:

1. A control device, comprising:
   a top surface;
   a bottom surface;
   circuitry for communicating with a mobile device and a headset, wherein the circuitry is adapted to enable a user to control the volume of audio signals, to stop and play audio signals, and to answer incoming phone calls;
   at least three buttons situated on the top surface designed to be actuated by a user wearing gloves;
   a securement mechanism for securing the control device to at least one of the following: the user's person, clothing or equipment;
   wherein the control device is operable in wet conditions; and
   wherein the control device is designed to communicate wirelessly with the mobile device.

2. The control device of claim 1, wherein three of the at least three buttons are situated substantially in line relative to each other.

3. The control device of claim 1, wherein the at least three buttons comprises: a first button, a second button, and a third button; wherein at least one of the at least three buttons allows the user to control the volume of audio signals; wherein at least one of the at least three buttons allows the user to stop audio signals; wherein at least one of the at least three buttons allows the user to play audio signals; and wherein at least one of the at least three buttons allows the user to answer incoming phone calls.

4. The control device of claim 1, further comprising a jack for receiving a plug.

5. The control device of claim 1, further comprising:
   a microphone;
   wherein the headset comprises a microphone alternate to the microphone of the control device; and wherein the circuitry comprises a switch, which when articulated, inactivates the microphone on the control device and allows a user to use the headset's microphone.

6. The control device of claim 1, wherein the control device is detachable from both the mobile device and the headset.

7. The control device of claim 1, wherein at least one of the at least three buttons can only be actuated when at least about 1.7 Newtons of force is exerted on at least one of the at least three buttons.

8. The control device of claim 1, wherein the circuitry automatically pauses, stops or mutes signals communicated from the mobile device to the control device upon the arrival of an incoming phone call to the mobile device; wherein the circuitry automatically resumes playing signals communicated from the mobile device to the control device upon the termination of an incoming phone call to the mobile device.

9. The control device of claim 1, wherein at least three of the at least three buttons are each about $1/16$ of an inch to about 5 inches wide and about $1/16$ of an inch to about 7 inches long in order to enable the user to actuate said buttons while wearing gloves.

10. The control device of claim 1,
    wherein the circuitry comprises: a first signal path, a second signal path, and a third signal path;
    wherein the first signal path facilitates the flow of signals from the mobile device ultimately to either a right or left speaker of the headset;
    wherein the second signal path facilitates the flow of signals from the mobile device ultimately to a speaker alternate to that of the first signal path; and
    wherein the third signal path facilitates the flow of signals from the control device ultimately to the mobile device.

11. The control device of claim 1, wherein the circuitry comprises a volume control system that facilitates the control of the volume of audio signals.

12. The control device of claim 3, further comprising:
    a microphone;
    wherein the circuitry comprises: a first push button, a second push button, a third push button, and a microphone system.

13. The control device of claim 12,
    wherein the first push button facilitates the operation of the first button;
    wherein the second push button facilitates the operation of the second button;
    wherein the third push button facilitates the operation of the third button; and
    wherein the microphone system facilitates the operation of the microphone.

14. The control device of claim 1, wherein the at least three buttons consist of exactly three buttons: a first button, a second button and a third button.

15. The control device of claim 1, wherein the circuitry comprises at least one microprocessor system and at least one wireless communication system.

16. The control device of claim 1, further comprising an interface and a volume control mechanism;
    wherein the interface is adapted to allow the user to receive information from and input information into the control device;

wherein the circuitry comprises a microprocessor system, a display system, a wireless communication system, a power system, and a volume control system;

wherein the microprocessor system facilitates the processing of communication from at least one of the following: the control device, the mobile device or the headset;

wherein the display system facilitates the operation of the interface;

wherein the wireless communication system facilitates wireless communication with the control device and at least one of the following: the mobile device or the headset;

wherein the power system facilitates the management of power of at least one of the following: the control device, the mobile device and the headset; and wherein the volume control system, in conjunction with the volume control mechanism, facilitates the control of the volume of audio signals communicated to the headset.

17. The control device of claim 16, wherein the microprocessor system comprises:
a data packetization/de-packing and/or merging/splitting system;
an audio/video remote control protocol and/or encode/decode system;
a display interface system;
a user control inputs system;
an advanced audio distribution profile and/or decode/encode system;
a digital output conditioning and/or volume control system;
a digital-to-analog conversion system;
a digital input conditioning system; and
an analog-to-digital conversion system.

18. The control device of claim 1, wherein the control device is manufactured to be waterproof.

19. The control device of claim 1, further comprising: a button situated on the side of the device for controlling the volume of audio signals.

20. A method of using a control device for communicating with a mobile device and a headset,
wherein the control device comprising:
a top surface;
a bottom surface;
circuitry for communicating with a mobile device and a headset, wherein the circuitry is adapted to enable a user to control the volume of audio signals, to stop and play audio signals, and to answer incoming phone calls;
at least three buttons situated on the top surface designed to be actuated by a user wearing gloves;
a securement mechanism for securing the control device to at least one of the following: the user's person, clothing or equipment;
wherein the control device is operable in wet conditions; and
wherein the control device is designed to communicate wirelessly with the mobile device;
wherein the method of using the control device comprising:
listening to audio signals communicated to the headset while a user engaging in a sport and/or another activity; and
actuating at least one of the at least three buttons on the control device while wearing gloves or other equipment to modify the audio signals being communicated to the headset.

* * * * *